US012388185B2

(12) United States Patent
Jia et al.

(10) Patent No.: US 12,388,185 B2
(45) Date of Patent: Aug. 12, 2025

(54) ANTENNA

(71) Applicant: Chengdu Tianma Micro-Electronics Co., Ltd., Chengdu (CN)

(72) Inventors: Zhenyu Jia, Chengdu (CN); Kerui Xi, Chengdu (CN); Baiquan Lin, Chengdu (CN); Linzhi Wang, Chengdu (CN); Xiaonan Han, Chengdu (CN); Yifan Xing, Chengdu (CN); Aowen Li, Chengdu (CN); Qiongqin Mao, Chengdu (CN)

(73) Assignee: Chengdu Tianma Micro-Electronics Co., Ltd., Chengdu (CN)

( * ) Notice: Subject to any disclaimer, the term of this patent is extended or adjusted under 35 U.S.C. 154(b) by 111 days.

(21) Appl. No.: 18/407,161

(22) Filed: Jan. 8, 2024

(65) Prior Publication Data

US 2025/0007170 A1 Jan. 2, 2025

(30) Foreign Application Priority Data

Jun. 29, 2023 (CN) ......................... 202310790215.7

(51) Int. Cl.
*H01Q 9/04* (2006.01)
*H01P 1/18* (2006.01)

(52) U.S. Cl.
CPC ............... *H01Q 9/045* (2013.01); *H01P 1/18* (2013.01)

(58) Field of Classification Search
CPC ........... H01Q 9/045; H01Q 1/38; H01Q 1/50; H01Q 1/52; H01Q 3/36; H01P 1/18
See application file for complete search history.

(56) References Cited

U.S. PATENT DOCUMENTS

| | | | | |
|---|---|---|---|---|
| 11,069,976 B1 * | 7/2021 | Xi | ........................ | H01Q 21/065 |
| 2022/0224006 A1 * | 7/2022 | Zhu | .......................... | H01Q 3/30 |
| 2022/0285807 A1 * | 9/2022 | Jia | ............................ | H01Q 3/36 |

FOREIGN PATENT DOCUMENTS

| | | |
|---|---|---|
| CN | 112151968 A | 12/2020 |

* cited by examiner

*Primary Examiner* — Dieu Hien T Duong
(74) *Attorney, Agent, or Firm* — Anova Law Group, PLLC

(57) ABSTRACT

An antenna includes a first base plate. The first base plate has a phase shifter array area and a bonding area. The first base plate includes a first substrate, a first metal layer, and a first conductive layer. The first conductive layer is made of a high-resistance conductive material. The first metal layer includes conductive pads and phase shifter units. At least some conductive pads are in the bonding area, and at least some phase shifter units are located in the phase shifter array area. The first conductive layer includes bias voltage lines, and one conductive pad is electrically connected to a corresponding phase shifter unit through at least one bias voltage line. At least some sections of one bias voltage line partially overlap with one corresponding phase shifter unit, and at least some sections of one bias voltage line overlap with one corresponding conductive pad.

20 Claims, 23 Drawing Sheets

ANTENNA

CROSS-REFERENCE TO RELATED APPLICATION

This application claims the priority of Chinese Patent Application No. 202310790215.7, filed on Jun. 29, 2023, the content of which is incorporated herein by reference in its entirety.

TECHNICAL FIELD

The present disclosure generally relates to the field of wireless communication technology and, more particularly, relates to an antenna.

BACKGROUND

With the development of mobile communication technology, mobile phones, PADs, notebook computers, etc., have gradually become indispensable electronic products in life, and these electronic products have been updated to electronic communication products that include antenna systems to enable communication functions. 5G is the research and development focus of the global industry. Among them, 5G antennas are the main means to achieve 5G ultra-high data transmission rates because of their high carrier frequency and large bandwidth characteristics. Therefore, the rich bandwidth resources of 5G frequency bands guarantees high-speed transmission rates. Various types of antennas have broad application prospects in satellite receiving antennas, vehicle radars, 5G base station antennas, and other fields. Compared with other types of antennas, microstrip antennas have a series of advantages including small size, free structure, low profile, easy integration, and low cost, and are widely used.

However, the current design structure of the antenna generally has a relatively complicated process and high cost, which is not conducive to the efficient improvement of the process. Further, the existing antenna design structure is prone to high-frequency signal leakage, which affects the performance of the antenna.

Therefore, it is a technical problem to be solved to provide an antenna structure that is able to reduce manufacturing cost, improve process efficiency, and ensure antenna performance.

SUMMARY

One aspect of the present disclosure provides an antenna. The antenna includes: a first base plate. The first base plate has a phase shifter array area and a bonding area. The first base plate includes a first substrate, a first metal layer, and a first conductive layer. The first metal layer is made of a material including copper, molybdenum and copper laminate, titanium and copper laminate, molybdenum-copper alloy, or titanium-copper alloy. The first conductive layer is made of a high-resistance conductive material, and is located on a side of the first metal layer away from the first substrate. The first metal layer includes a plurality of conductive pads and a plurality of phase shifter units. At least a portion of the plurality of conductive pads is located in the bonding area, and at least a portion of the plurality of phase shifter units is located in the phase shifter array area. The first conductive layer includes a plurality of bias voltage lines, and one of the plurality of conductive pads is electrically connected to a corresponding one of the plurality of phase shifter units through at least one of the plurality of bias voltage lines; and in a direction perpendicular to a plane where the first substrate is located, in one same bias voltage line of the plurality of bias voltage lines, at least some sections of the bias voltage line partially overlap with a corresponding one of the plurality of the phase shifter units, and at least some sections of the bias voltage line overlaps with a corresponding one of the plurality of conductive pads.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
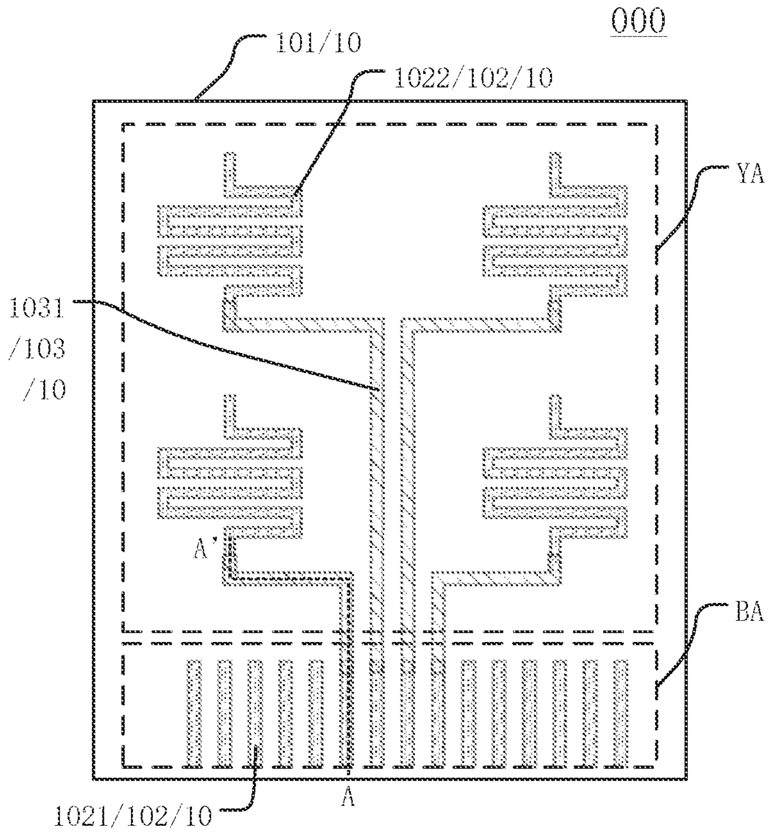
FIG. 1 illustrates a planar structure of an exemplary antenna consistent with various disclosed embodiments of the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like portions, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be exaggerated. Besides, those schematic diagrams are merely examples, and not intended to limit the scope of the disclosure. Furthermore, a three-dimensional (3D) size including length, width, and depth should be considered during practical fabrication.

Figure 2:
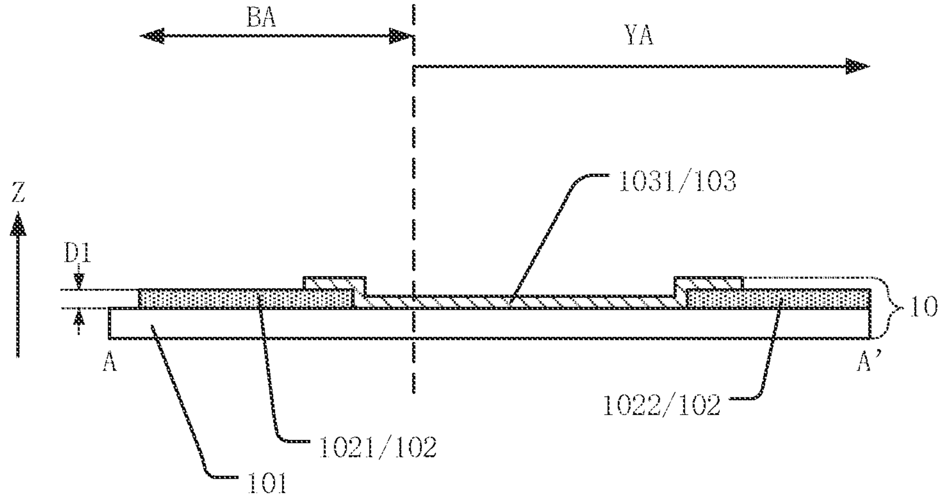
FIG. 2 illustrates a cross-sectional view along an A-A' direction in FIG. 1, consistent with various disclosed embodiments of the present disclosure.

On embodiment of the present disclosure provides an antenna 000. In one embodiment, as shown in FIG. 1 showing a planar structure of the antenna and FIG. 2 showing a cross-sectional view along an A-A' direction in FIG. 1, the antenna 000 may include a first base plate 10. The first base plate 10 may include a phase shifter array area YA and a bonding area BA.

The first base plate 10 may include a first substrate 101, a first metal layer 102 and a first conductive layer 103. The first metal layer 102 may be made of a material including copper, a laminate of molybdenum and copper, a laminate of titanium and copper, molybdenum-copper alloy, titanium-copper alloy, or a combination thereof. The first conductive layer 103 may be made of a high-resistance conductive material, and may be located on a side of the first metal layer 102 away from the first substrate 101.

The first metal layer 102 may include a plurality of conductive soldering pads 1021 and a plurality of phase shifter units 1022. At least a portion of the plurality of conductive soldering pads 1021 may be located in the bonding area BA, and the plurality of phase shifter units 1022 may be located in the phase shifter array area YA.

The first conductive layer 103 may include a plurality of bias voltage lines 1031, and one of the plurality of conductive pads 1021 may be electrically connected to a corresponding one of the plurality of phase shifter units 1022 through at least one of the plurality of bias voltage lines 1031.

In a direction Z perpendicular to the plane where the first substrate 101 is located, in one same bias voltage line 1031, at least some segments of the bias voltage line may partially overlap one corresponding phase shifter unit 1022, and at least some segments of the bias voltage line may partially overlap one corresponding conductive pad 1021.

In the present embodiment, the antenna 000 may include at least the first base plate 10. Optionally, in one embodiment, the antenna 000 may be a microstrip antenna. In some other embodiments, the antenna 000 may be a liquid crystal antenna. The embodiment shown in FIG. 1 where the antenna 000 is a microstrip antenna is used as an example to illustrate the present disclosure. The first base plate 10 may include the phase shifter array area YA and the bonding area BA, that is, the antenna 000 may at least include the phase shifter array area YA and the bonding area BA. The phase shifter array area YA may be used to accommodate a microstrip line structure, and the bonding area BA may be used to accommodate the plurality of conductive pads 1021. The first base plate 10 of this embodiment may include the first substrate 101, the first metal layer 102, and the first conductive layer 103. In one embodiment, for example, the first base plate 101 (not filled in the figure) may be made of a hard material including glass or ceramics, or may be made of a flexible material including polyimide or silicon nitride. These materials may not absorb microwave signals, that is, the insertion loss in the microwave frequency band may be small. Therefore, the signal insertion loss may be reduced, and the loss of microwave signals during transmission may be suppressed effectively.

The first metal layer 102 may include the plurality of conductive pads 1021 and the plurality of phase shifter units 1022. At least a portion of the plurality of conductive pads 1021 may be located in the bonding area BA, and the plurality of phase shifter units 1022 may be located in the phase shifter array area YA. For description purposes only, the embodiment shown in FIG. with four microstrip line structure phase shifter units 1022 and a portion of the plurality of conductive pads 1021 on the first substrate 101 is used as an example to illustrate the present disclosure, and it does not limit the scope of the present disclosure. In various embodiments, during specific implementation, the quantity of the plurality of conductive pads 1021 and the plurality of phase shifter units 1022 may be arranged in an array according to actual requirements. The plurality of phase shifter units 1022 may be located in the phase shifter array area YA. One phase shifter unit 1022 of the plurality of phase shifter units 1022 may be a microstrip line structure, and the shape of the phase shifter u1) 1022 may be serpentine (as shown in FIG. 1), spiral (not shown in the figure), or other structures, which are not limited in the present disclosure. The phase shifter unit 1022 may be a microstrip line structure for coupling microwave signals. The plurality of conductive pads 1021 may be located in the bonding area BA, and may be used to subsequently bond a driving chip in the bonding area BA, to provide a driving signal required for the antenna 000 to work through the driving circuit when the antenna 000 is working. In this embodiment, the plurality of conductive pads 1021 and the plurality of phase shifter units 1022 may be made of the same first metal layer 102, which may reduce the number of masks used and reduce the manufacturing cost.

The phase shifter unit 1022 of the microstrip line structure may be made of a metal material. The thickness of the first metal layer 102 may be related to the working frequency of the antenna. When high-frequency signals are transmitted in a metal, a skin phenomenon may occur. The skin phenomenon may make the effective resistance of the metal increase. When the frequency is higher, the skin phenomenon may be more significant. When the high frequency current passes through the microstrip line structure, it may be considered that the current flows only in a very thin layer on the surface of the microstrip line structure. This is equivalent to that the cross-section of the microstrip line structure is reduced, such that the resistance is increased. The thickness of the first metal layer 102 generally needs to be 3-6 times the skin depth. Therefore, the first metal layer 102 of the phase shifter unit 1022 may need to be very thick to meet the relevant design requirements, otherwise the insertion loss of the electromagnetic signal may be greatly increased. Therefore, the first metal layer 102 in this embodiment may be made of a material including copper, molybdenum and copper laminate, titanium and copper laminate, molybdenum-copper alloy, titanium-copper alloy, or a combination thereof. It can be understood that when the first metal layer 102 is made of molybdenum and copper laminate, the first metal layer 102 may be a stacked structure of molybdenum material and copper material. When the first metal layer 102 is made of titanium and copper laminate, the first metal layer 102 may be a stacked structure of titanium material and copper material. Because of the low resistivity and cheap price of metal copper, using at least one of copper, molybdenum and copper laminates, titanium and copper laminates, molybdenum-copper alloy, or titanium-copper alloy, to form the first metal layer, may be beneficial to reduce cost. Further, the first metal layer 102 of copper, molybdenum and copper laminate, titanium and copper laminate, molybdenum-copper alloy or titanium-copper alloy material may be made thicker during the manufacturing process. That is, the microstrip-structure phase shifter unit 1022 made from the first metal layer 102 may be thicker, to meet the coupling effect of high frequency signals in the microstrip structure.

The first metal layer 102 in this embodiment may be made of a material including copper, molybdenum and copper laminate, titanium and copper laminate, molybdenum-copper alloy, titanium-copper alloy, or a combination thereof. The thickening process of materials such as copper metal is relatively mature. This embodiment does not specifically limit the thickening process. Optionally, in one embodiment, a physical vapor deposition (PVD) process may be used to produce a seed layer of copper metal, and then the first metal layer may be thickened by an electroplating process. In some other embodiments, some other processes for making thick copper metal layer may also be used, which will not be described in detail in this embodiment. For details, reference may be made to the process for making thick copper metal in the related art.

One conductive pad 1021 of the plurality of conductive pads 1021 needs to be electrically connected to one corresponding phase shifter unit 1022 of the plurality of phase shifter units 1022 through at least one bias voltage line of the plurality of bias voltage lines, to transmit the bias voltage signal provided by the driver chip bound at the position of the conductive pad 1021 to the corresponding phase shift unit 1022 through the bias voltage line, to provide driving signals.

However, to improve the process efficiency, the bias voltage line may be also made of the first metal layer 102. To ensure the coupling effect of high-frequency signals in the microstrip line structure, when the thickness of the first metal layer 102 for the plurality of phase shifter units 1022 with the microstrip structure is increased to about 2 μm-3 μm, it will be very difficult to manufacture the plurality of bias voltage lines with such a thick first metal layer 102. The increase in the thickness of the first metal layer 102 may gradually increase the difficulty of the etching process, and gradually increase the difficulty of controlling the accuracy of the line width and line spacing. The minimum line width and line spacing process capability is limited. When such a thick first metal layer 102 is used to manufacture the bias voltage lines, the minimum line spacing may reach 8-10 μm. Especially for large-scale antenna arrays, the layout design of signal lines may be very difficult, and it may be easy to limit the minimum line width and line spacing specifications between signal lines, which is very unfavorable for the design of large-scale arrays. The wiring space is very limited. Further, when a material including copper, molybdenum and copper laminate, titanium and copper laminate, molybdenum-copper alloy, titanium-copper alloy, or a combination thereof molybdenum-copper alloy or titanium-copper alloy is used to make the bias voltage line, since these metal materials themselves are used as carriers of high-frequency signals in the antenna structure, leakage of the high-frequency signals may be easily generated through the signal lines of these metal materials, affecting the external drive circuit of the antenna and resulting in an impact on the performance of the antenna.

In some existing technologies, after forming the phase shifter unit of the microstrip line structure, the copper layer used to make the bias voltage line is thinned, and then etched to form the bias voltage line. However, it is very difficult to form the metal layer with different thickness in different region. Even if it is produced by special processes, the cost will be extremely expensive. Therefore, the commonly used cost-saving method in this field is to make the patterns of the same metal structure with the same thickness of metal. Not only it is difficult to manufacture, but also the wiring accuracy of the signal lines cannot be effectively controlled. Further, it is easy to cause high-frequency signal leakage, affecting the use of the antenna.

In the present disclosure, the first conductive layer 103 may include the plurality of bias voltage lines 1031, and one conductive pad 1021 of the plurality of conductive pads may be electrically connected to one corresponding phase shifter unit 1022 of the plurality of phase shifter units 1022 through at least one bias voltage line 1031 of the plurality of bias voltage lines 1031. That is, the first conductive layer 103 for making the plurality of bias voltage lines 1031 may be made of a high resistive conductive material. Optionally, in one embodiment, the first conductive layer 103 may be made of indium tin oxide or metal chromium, such as indium tin oxide (ITO), indium zinc oxide (IZO), aluminum zinc oxide (AZO), or indium gallium oxide (IGO), or other conductive transparent metal oxide materials with high resistance characteristics, or high-resistance conductive materials such as metal chromium with high resistance characteristics. The present disclosure has no limit on this.

In one embodiment, the plurality of phase shifter units 1022 of the microstrip line structure, the plurality of conductive pads 1021, and the plurality of bias voltage lines 1031 in the first base plate 10, may be configured to be made of different conductive materials. Instead of the metal material used in the existing technologies, a conductive material with high resistance characteristics may be used to form the plurality of bias voltage lines 1031. Since the high-resistance conductive material itself has high resistance characteristics, the high frequency signal leaked during the use of the antenna may be lost during the transmission in the plurality of bias voltage lines 1031, thereby improving the leakage problem of the high frequency and reducing the impact of high-frequency signals on external drive circuits such as drive chips. The overall performance of the antenna 000 may be improved.

The first conductive layer 103 may be made of transparent conductive metal oxide materials such as indium tin oxide. The patterning process of transparent conductive materials is a relatively mature process in existing technology. The related yield rate and the process parameters are very mature, and the minimum line spacing can be controlled to 3-5 μm. Therefore, the strong process capabilities of the transparent conductive materials may be exploited to make the wiring of large-scale arrays in the antenna 000 structure easier, compared to the minimum line spacing of the plurality of bias voltage lines 1031 made of thick copper metal layers which is about 8-10 μm. The spacing between the plurality of bias voltage lines 1031 may be effectively reduced, thereby effectively reducing the difficulty of wiring the plurality of bias voltage lines 1031. Further, the accuracy of the line width and line spacing of the plurality of bias voltage lines 1031 may be relatively easy to control, which may effectively reduce the difficulty of wiring design while ensuring the manufacturing accuracy. The designability of the array structure in the antenna 000 and the process efficiency may be improved.

The first conductive layer 103 may be located on the side of the first metal layer 102 away from the first substrate 101. In the direction Z perpendicular to the plane where the first substrate 101 is located, in one same bias voltage line 1031, at least part of the bias voltage line 1031 may partially overlap with one corresponding phase shifter unit 1022, and at least part of the bias voltage line may overlap with one corresponding conductive pad 1021, such that the bias voltage line at least partially covering the first metal layer 102 through the first conductive layer 103. Therefore, materials such as copper metal may be protected, to prevent a partial structure of the first metal layer 102 from being corroded by water or oxygen and affecting the product yield. The first conductive layer 103 of the first base plate 10 may include the plurality of bias voltage lines 1031, one conductive pad 1021 may be electrically connected to one corresponding phase shifter unit 1022 through at least one of the plurality of bias voltage lines 1031, and each phase shifter unit 1022 of the microstrip line structure may be independently controlled through at least one corresponding bias voltage line 1031. That is, one bias voltage line 1031 may be used to transmit the voltage signal provided by the external drive circuit bound to the bonding area BA through one corresponding conductive pad 1021 to one corresponding phase shifter unit 1022 of microstrip line structure, to realize the wireless communication function of the antenna 000. Further, In the direction Z perpendicular to the plane where the first substrate 101 is located, in one same bias voltage line 1031, at least part of the bias voltage line 1031 may partially overlap with one corresponding phase shifter unit 1022, and at least part of the bias voltage line may overlap with one corresponding conductive pad 1021. Therefore, two ends of one bias voltage line 1031 made of transparent conductive material may have overlapping areas with one corresponding phase shifter unit 1022 of the microstrip line structure and one corresponding conductive pad 1021 through the ramping process respectively, to realize electrical connection effect. The stability and reliability of the electrical connection of them may be improved.

In the antenna provided by the present disclosure, the plurality of phase shifter units 1022 and the plurality of conductive pads 1021 may be formed from the same first metal layer 102, and the first metal layer 102 may be made of a material including copper, molybdenum and copper laminate, titanium and copper laminate, molybdenum-copper alloy or titanium-copper alloy. The cost of the production may be reduced. At the same time, a same mask plate may be used to form the plurality of phase shifter units 1022 and the plurality of conductive pads 1021. The amount of light (mask) used and related process costs may be reduced, to improve the process efficiency. Also, it may be possible to make the first metal layer 102 of copper, molybdenum and copper laminates, titanium and copper laminates, molybdenum-copper alloys, or titanium-copper alloy thick during the process, to meet the requirements of the coupling effect of the high-frequency signals in the microstrip line structure and ensure the performance of the antenna. The plurality of bias voltage lines 1031 may be made of a conductive material with high resistance characteristics instead of the metal material. Therefore, the high-frequency signals leaked during the operation of the antenna may be dissipated in the plurality of bias voltage lines 1031 during transmission because of the high resistance characteristics of the high resistance material. The leakage of the high frequency signals may be improved, and the impact of high-frequency signals on external drive circuits such as drive chips may be reduced, improving the overall performance of the antenna 000.

The above embodiments are used as examples only to illustrate the structure of the antenna 000 provided by the present disclosure, and do not limit the scope of the present disclosure. In various embodiments, the structure of the antenna 000 is not limited to these descriptions, but may include other structures. For example, in some other embodiments, the antenna 000 may be a liquid crystal antenna, and may include some structure of the liquid crystal antenna in existing technologies. Also, the above embodiments are used as examples only to illustrate the structure of the first metal layer 102 and the first conductive layer 103 provided by the present disclosure, and do not limit the scope of the present disclosure. In various embodiments, the structure of the antenna 000 is not limited to these descriptions, but may include other structures according to the requirements of the antenna functions.

In some embodiments, as shown in FIG. 1 and FIG. 2, in the direction perpendicular to the plane where the first substrate 101 is located, the thickness D1 of the first metal layer 102 may be about 0.5 μm to about 5 μm.

When the metal material is used to form the plurality of phase shifter units 1022 of microstrip structure, in the direction perpendicular to the plane where the first substrate 101 is located, the thickness D1 of the first metal layer 102 may be configured to be relatively large, for example, to be about 0.5 μm to about 5 μm. Further, in some embodiments, in the direction perpendicular to the plane where the first substrate 101 is located, the thickness D1 of the first metal layer 102 may be about 2 μm to about 3 μm. The thickness of the microstrip is related to the operational frequency of the antenna. When high-frequency signals are transmitted in a microstrip structure, a skin phenomenon may occur. The skin phenomenon may make the effective resistance of the metal increase. When the frequency is higher, the skin phenomenon may be more significant. When the high frequency current passes through the microstrip line structure, it may be considered that the current flows only in a very thin layer on the surface of the microstrip line structure. This is equivalent to the cross-section of the microstrip line structure is reduced, such that the resistance is increased. The plurality of phase shifter units 1022 of microstrip structure may need to be thick to meet the requirements of the high frequency signal transmission in the microstrip structure. In these embodiments, the thickness D1 of the first metal layer 102 may be configured to be about 0.5 μm to about 5 μm, which may be about 3-6 times the skin depth (The skin depth is the thickness at which most charges are located as they propagate through a conductor). The insertion loss of the electromagnetic signal may be greatly reduced, which is beneficial to improving the performance of the antenna 000.

Figure 3:
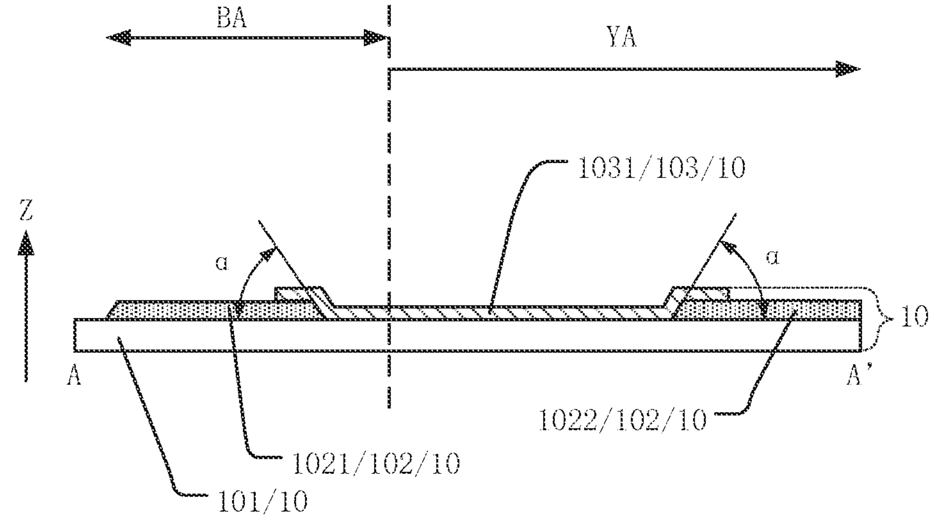
FIG. 3 illustrates another cross-sectional view along the A-A' direction in FIG. 1, consistent with various disclosed embodiments of the present disclosure.

In some embodiments shown in FIG. 1 and FIG. 3 which is another cross-sectional view along the A-A' direction in FIG. 1, an edge of one conductive pad 1021 and an edge of one phase shifter unit 1022 of the first metal layer 102 may include a slope with a slope angle α (a tape angle), respectively. Generally, when the patterned conductive pad 1021 and the phase shifter unit 1022 are formed by an etching process, the slope angle α of the patterned structure may generally be formed in the manufacturing process, and the slope angle α may be designed to be generally about 60°. The two ends of the corresponding bias voltage line 1031 made of transparent conductive materials may have overlapping areas with the conductive pad 1021 and the phase shifter unit 1022 of the microstrip structure through the slope ramping process respectively. The stability of the electrical connection may be improved. And at the same time, the problem of disconnection when the bias voltage line 1031 ramps up may be avoided, which is conducive to improving the process yield.

Figure 4:
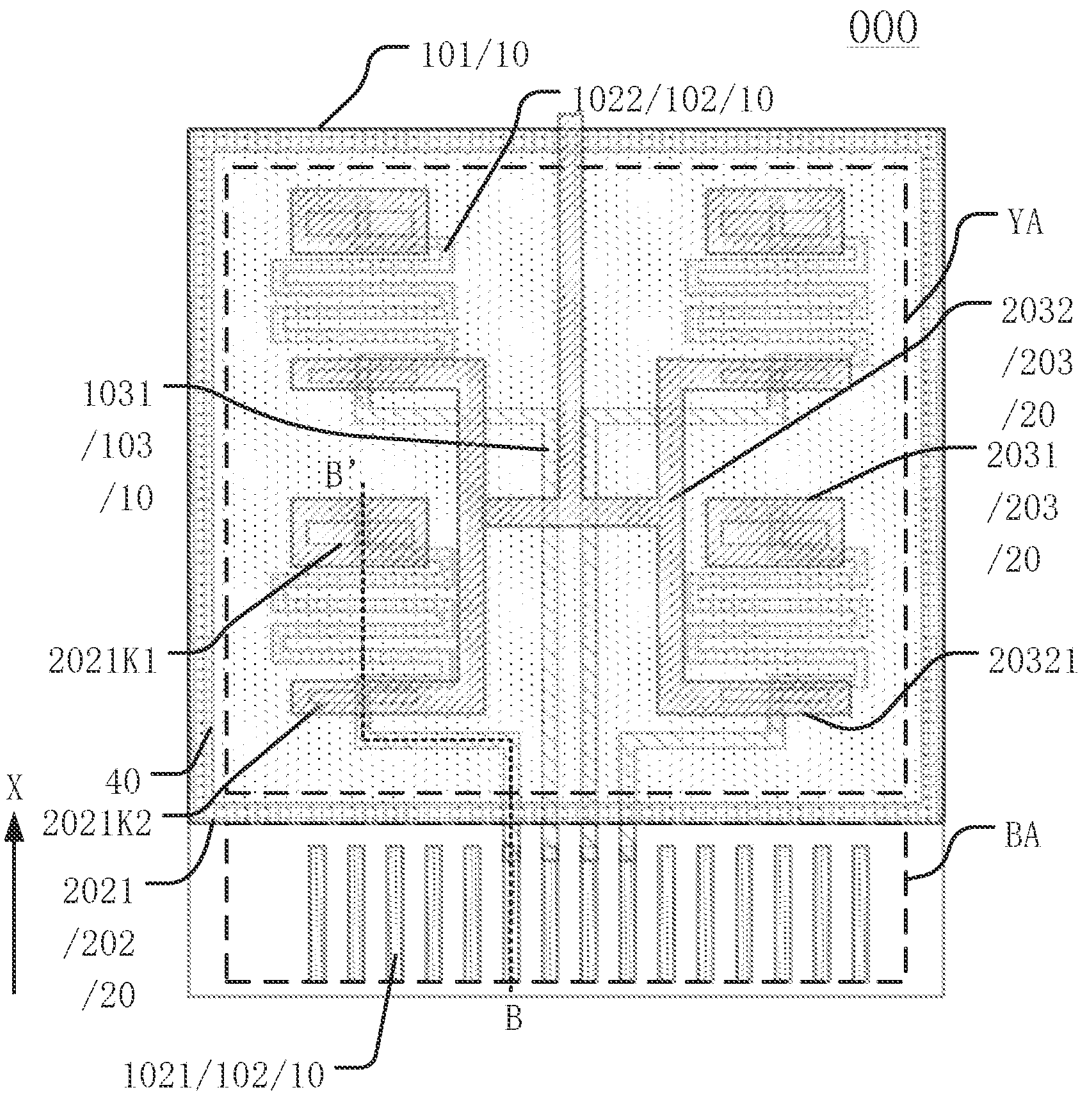
FIG. 4 illustrates a planar structure of another exemplary antenna consistent with various disclosed embodiments of the present disclosure.
Figure 5:
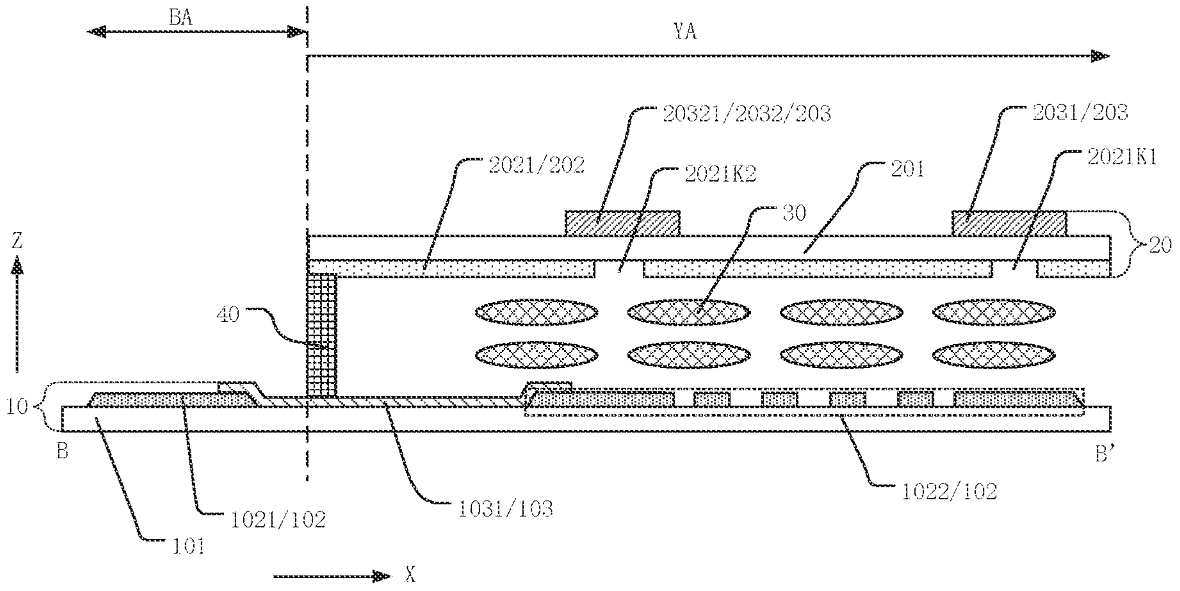
FIG. 5 illustrates a cross-sectional view along a B-B' direction in FIG. 4, consistent with various disclosed embodiments of the present disclosure.

In some embodiments shown in FIG. 4 which is another planar structure of the antenna and FIG. 5 is a cross-sectional view along the B-B' direction in FIG. 4, the antenna 000 may also include a second base plate 20. The first base plate 10 and the second base plate 20 may be arranged oppositely to each other, and a liquid crystal layer 30 may be included between the first base plate 10 and the second base plate 20.

The second base plate 20 may include a second substrate 201 and a second metal layer 202. The second metal layer 202 may be located on a side of the second base plate 201 facing the first base plate 10, and the second metal layer 202 may include a ground structure 2021.

In the present embodiment, the antenna 000 may be a liquid crystal antenna. The liquid crystal antenna is a new array antenna based on a liquid crystal phase shifter, and is widely used in satellite receiving antennas, vehicle radars, base station antennas and other fields. The antenna 000 may further include the second base plate 20 opposite to the first substrate 10, and the liquid crystal layer 30 may be included between the first base plate 10 and the second substrate 20. The second base plate 20 may include the second substrate 201 and the second metal layer 202. The second substrate 201 may be made of a material same as the first substrate 101, and the second metal layer 202 may be made of a material same as the first metal layer 102. The second metal layer 202 may be located on the side of the second substrate 201 facing the first base plate 10, and may include the ground structure 2021. The plurality of phase shifter units 1022 may be phase shifter structures of the microstrip structure. A phase shifter is a core component of the liquid crystal antenna. An electric field may be formed between one of the plurality of phase shifter units 1022 of the microstrip structure and the ground structure 2021, to control deflection of the liquid crystal molecules of the liquid crystal layer 30, to realize the control of the equivalent dielectric constant of the liquid crystal and further realize the adjustment of the phase of the electromagnetic wave. The liquid crystal antenna has broad application prospects in satellite receiving antennas, vehicle radars, 5G base station antennas and other fields.

In some embodiments as shown in FIG. 4 and FIG. 5, an orthographic projection of the second substrate 201 on the first substrate 101 may not overlap with the bonding area BA, that is, the area of the second substrate 201 may be smaller than the area of the first substrate 101, such that at least a portion of the plurality of conductive pads 1021 in the bonding area BA is exposed, to facilitate the subsequent bonding of structures such as a driver chip in the bonding area BA.

As shown in FIG. 4 and FIG. 5, in some embodiments, in the antenna 000, the ground structure 2021 of the second metal layer 202 may include a plurality of first radiation holes 2021K1 and a plurality of second radiation holes 2021K2. A third metal layer 203 may be further provided on the side of the second substrate 201 away from the liquid crystal layer 30. The third metal layer 203 may include a plurality of radiation patches 2031 and a power division network structure 2032. The orthographic projection of the plurality of radiation patches 2031 on the plane where the second substrate 201 is located may overlap with the orthographic projection of the plurality of first radiation holes 2021K1 on the plane where the second substrate 201 is located. The power division network structure 2032 may include a plurality of output terminals 20321, and the orthographic projections of the plurality of output terminals 20321 on the plane where the second substrate 201 may overlap with the orthographic projections of the plurality of second radiation holes 2021K2 on the plane where the second substrate 201 is located. Further, in one embodiment, optionally, the orthographic projection of the plurality of second radiation holes 2021K2 on the plane of the first substrate 101 may at least partially overlap the orthographic projection of the plurality of phase shifter units 1022 on the plane of the first substrate 101.

In the present disclosure, the antenna 000 may further include the third metal layer 203, and the third metal layer 203 may be used to set the plurality of power division network structures 2032 and the plurality of radiation patches 2031 with block structures. The orthographic projection of the plurality of radiation patches 2031 on the plane where the second substrate 201 is located may overlap with the orthographic projection of the plurality of first radiation holes 2021K1 on the plane where the second substrate 201 is located. The plurality of power distribution network structures 2032 may include a plurality of branch structures and a plurality of output terminals. Microwave signals may be generally fed into one power distribution network structure 2032 through a corresponding signal feed-in rod (not shown in the figure), and transmitted to one corresponding output terminal through the plurality of branch structures of the plurality of power distribution network structures 2032. The plurality of output terminals 20321 may correspond to the plurality of second radiation holes 2021K2 included in the ground structure 2021. Therefore, the microwave signals may be coupled to each phase shifter unit 1022 through the plurality of second radiation holes 2021K2 through the liquid crystal layer 30. The plurality of radiation patches 2031 may be used to couple the phase-shifted microwave signal to the plurality of radiation patches 2031 through the plurality of first radiation holes 2021K1 of the ground structure 2021 after the phase shift of the microwave signal is completed, and radiate the microwave signal of the antenna 000 through the plurality of radiation patches 2031. When the antenna 000 of this embodiment is working, a circuit structure such as a driver chip that is subsequently bonded in the bonding area BA, may apply a bias voltage signal to the plurality of phase shifter units 1022 of the microstrip structure through the plurality of bias voltage lines 1031, to form a deflection electric field between the first metal layer 102 and the second metal layer 202 of the antenna 000, such that the liquid crystal molecules in the liquid crystal layer 30 between the two metal layers may be deflected. Since the degree of deflection of the liquid crystal molecules varies with the different applied voltage, the dielectric constant of the liquid crystal layer 30 between the first metal layer 102 and the second metal layer 202 may be controlled and adjusted. The wavelength of the high-frequency electric field transmitted in the plurality of phase shifter units 1022 of the microstrip line structure may be related to the dielectric constant of the liquid crystal. Therefore, when the phase of the radio frequency signal at the entrance of the plurality of phase shifter units 1022 of the microstrip line structure is constant, by adjusting the degree of deflection of the liquid crystal molecules in the liquid crystal layer 30, the phase adjustment of the outlet may be realized. By adjusting the phase difference between the different phase shifter units 1022 of the microstrip line structures in the phase shifter array area YA, the adjustment of the radiation beam direction may be realized. After the phase shift of the microwave signal is finished, the phase-shifted microwave signal may be coupled to the plurality of radiation patches 2031 through the plurality of first radiation holes 2021K1 of the ground structure, and then be radiated out through the plurality of radiation patches 2031. The plurality of phase shifter units 1022 of the microstrip line structure, the plurality of first radiation holes 2021K1, the plurality of second radiation holes 2021K2 of the ground structure 2021 above the plurality of phase shifter units 1022, the plurality of radiation patches 2031 of the third metal layer 203, and the plurality of power division network structures 2032 may cooperate to form an array structure of the entire antenna.

In one embodiment, a shape of one phase shifter unit 1022 of the plurality of phase shifter units 1022 may be a serpentine or helical microstrip line structure, and the serpentine or helical phase shifter unit 1022 may increase the facing area of the phase shifter unit 1022 and the ground structure 2021, to ensure that as many liquid crystal molecules as possible in the liquid crystal layer 30 are in the electric field formed by the phase shifter unit 1022 and the ground structure 2021. The inversion efficiency of the liquid crystal molecules may be improved. The present disclosure has no limit on the shape and distribution of the plurality of phase shifter units 1022, as long as they are able to realize the transmission of microwave signals.

The above embodiments are used as examples only to illustrate the structure of the antenna 000 when it is a liquid crystal structure provided by the present disclosure, and do not limit the scope of the present disclosure. In various embodiments, the antenna 000 may include other structures, such as an alignment layer (not shown in the figure) between the first base plate 10 and the second base plate 20, a frame glue 40 between the first base plate 10 and the second base plate 20, or other structures of the liquid crystal antenna in existing technologies. Also, the above embodiments are used as examples only to illustrate the structure of the first metal layer 102, the first conductive layer 103, the second metal layer 202, and the third metal layer 203, and do not limit the scope of the present disclosure. In various embodiments, the structure of the antenna 000 is not limited to these descriptions, but may include other structures according to the requirements of the antenna functions.

In some embodiments shown in FIG. 4 and FIG. 5, the first base plate 10 and the second base plate 20 may be fixed by the frame glue 40. The frame glue 40 may be arranged between the first base plate 10 and the second base plate 20 around the liquid crystal layer 30. The orthographic projection of the plurality of conductive pads 1021 on the first substrate 101 may not overlap with the orthographic projection of the frame glue 40 on the first substrate 101. Along the direction X from the bonding area BA pointing to the phase shifter array area YA, the plurality of conductive pads 1021 may be located on a side of the frame glue 40 away from the liquid crystal layer 30. In the present embodiment, the frame glue 40 may be provided between the first base plate 10 and the second base plate 20, such that the frame glue 40 is arranged around the liquid crystal layer 30 to form a sealed liquid crystal cell structure of the antenna 000 to avoid the leakage of the liquid crystal molecules in the liquid crystal layer 30. In this embodiment, the orthographic projection of the plurality of conductive pads 1021 on the first substrate 101 may not overlap with the orthographic projection of the frame glue 40 on the first substrate 101. Therefore, the pressure of the frame glue 40 may be prevented from affecting the plurality of conductive pads 1021 in the bonding area BA, which is beneficial to ensure the conductive yield of the plurality of conductive pads 1021.

Figure 6:
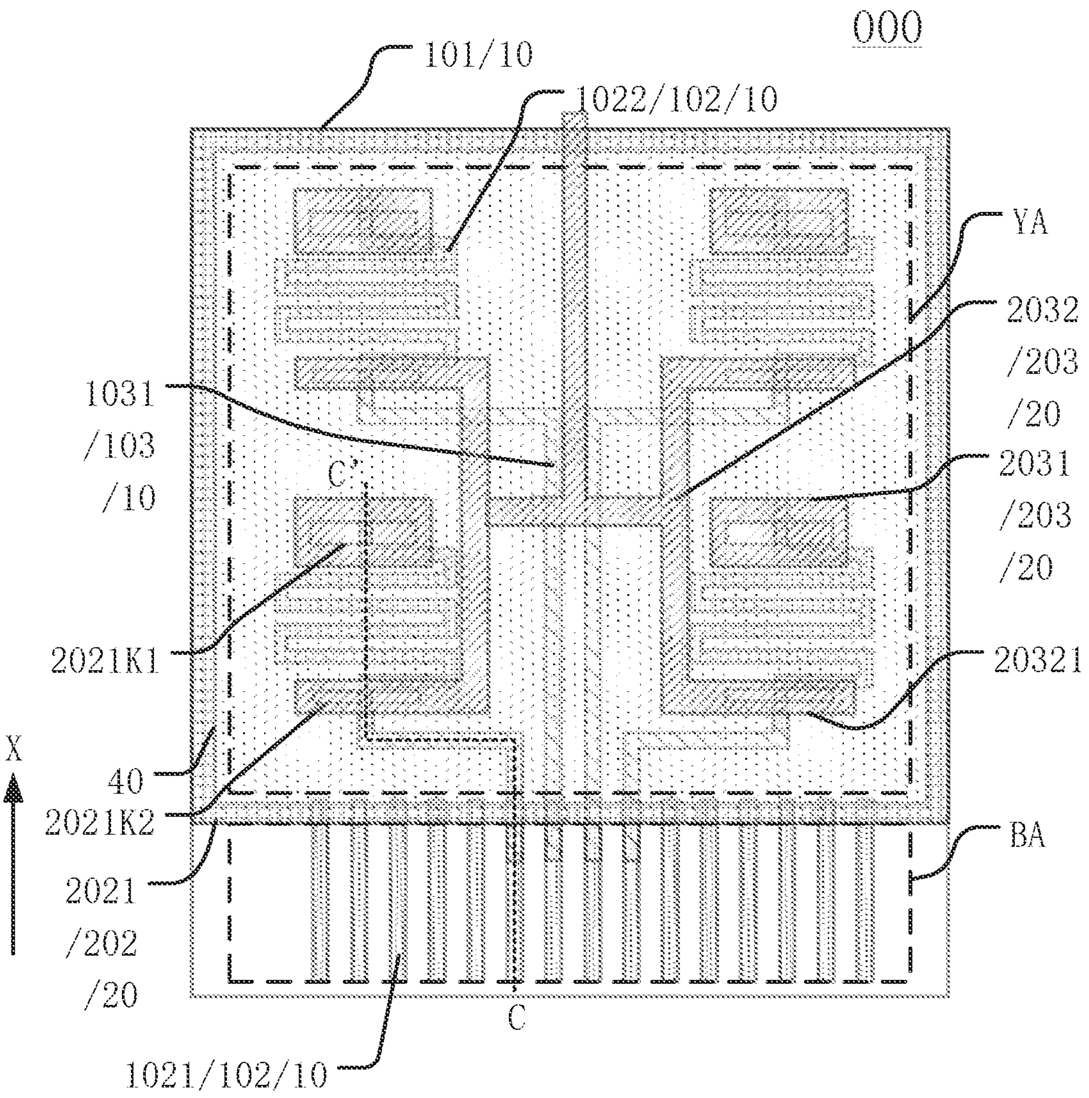
FIG. 6 illustrates a planar structure of another exemplary antenna consistent with various disclosed embodiments of the present disclosure.
Figure 7:
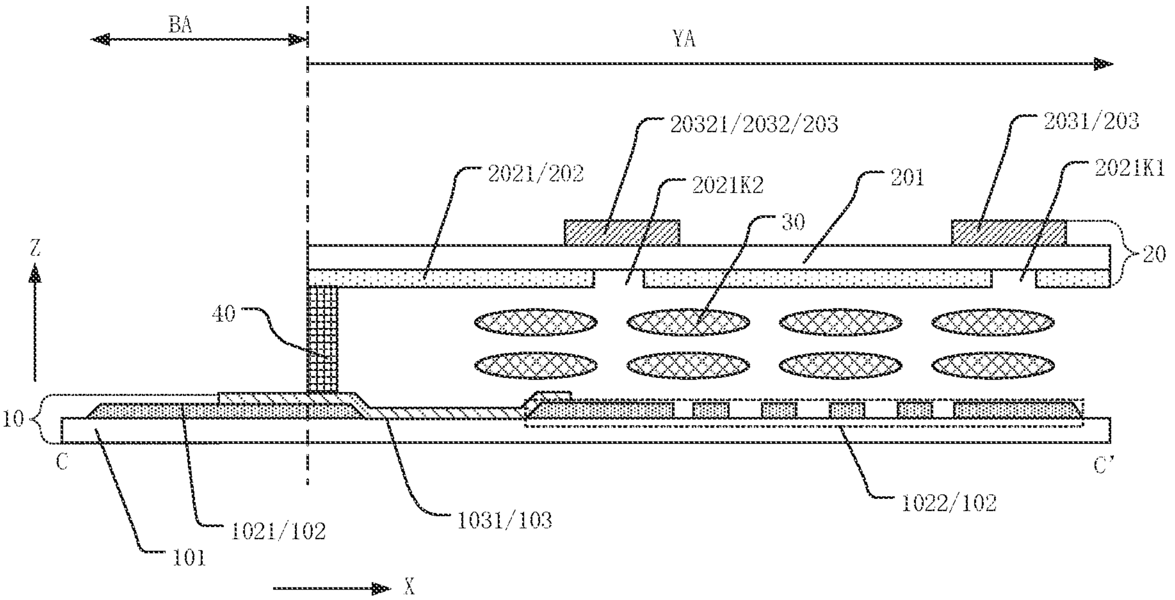
FIG. 7 illustrates a cross-sectional view along a C-C' direction in FIG. 6, consistent with various disclosed embodiments of the present disclosure.

In some embodiments shown in FIG. 6 which is another planar structure of the antenna and FIG. 7 is a cross-sectional view along the C-C' direction in FIG. 6, the first base plate 10 and the second base plate 20 may be fixed by the frame glue 40, and the frame glue 40 may be arranged between the first base plate 10 and the second base plate 20. The frame glue 40 may be arranged around the liquid crystal layer 30.

The orthographic projection of the plurality of conductive pads 1021 on the first substrate 101 may at least partially overlap with the orthographic projection of the frame glue 40 on the first substrate 101.

In the present embodiment, the frame glue 40 may be provided between the first base plate 10 and the second base plate 20, such that the frame glue 40 is arranged around the liquid crystal layer 30 to form a sealed liquid crystal cell structure of the antenna 000 to avoid the leakage of the liquid crystal molecules in the liquid crystal layer 30. The orthographic projection of the plurality of conductive pads 1021 on the first substrate 101 may at least partially overlap with the orthographic projection of the frame glue 40 on the first substrate 101. That is, at least a portion of the plurality of conductive pads 201 may be set to close to the direction of the phase shifter array area YA and extended to the periphery of the bonding area BA. By extending the length of the plurality of conductive pads 1021 in the direction X from the bonding area BA to the phase shifter array area YA, the contact area between the plurality of bias voltage lines 1031 of the first conductive layer 103 and the plurality of conductive pads 1021 of the first metal layer 102 may be increased, to reduce the influence of the unreliable joint area on the overall electrical connection performance and improve the overall electrical connection reliability between the plurality of bias voltage lines 1031 and the plurality of conductive pads 1021. Also, since the metal material of the plurality of conductive pads 1021 in the bonding area BA is relatively soft, the ACF (Anisotropic Conductive Film) glue used in the bonding process may easily press the first conductive layer 103 to crack on the surface when subsequently bonding the driving chip or a flexible circuit board, and may affect the ramping area between the plurality of bias voltage lines 1031 and the plurality of conductive pads 1021. By extending the length of the plurality of conductive pads 1021 in the direction X from the bonding area BA to the phase shifter array area YA, at least a portion of the plurality of extended conductive pads 1021 may be free from the pressure caused by the subsequent bonding of the driving chip or the flexible circuit board. Therefore, even if a portion of the plurality of bias voltage lines 1031 in the bonding area BA during bonding is affected by the pressure of the ACF glue to produce cracks, at least the extended sections of the plurality of conductive pads 1021 outside the bonding area BA may be form a good electrical connection with the plurality of bias voltage lines 1031, reducing the degree of influence of the bonding pressure on the cracking of the transparent conductive material and reducing the influence on the electrical connection between at least some sections of the plurality of bias voltage lines and the plurality of conductive pads 1021. Reliability of the electrical connection when one of the plurality of bias voltage lines 1031 climbs at one end of a corresponding one of the conductive pads 1021.

Figure 8:
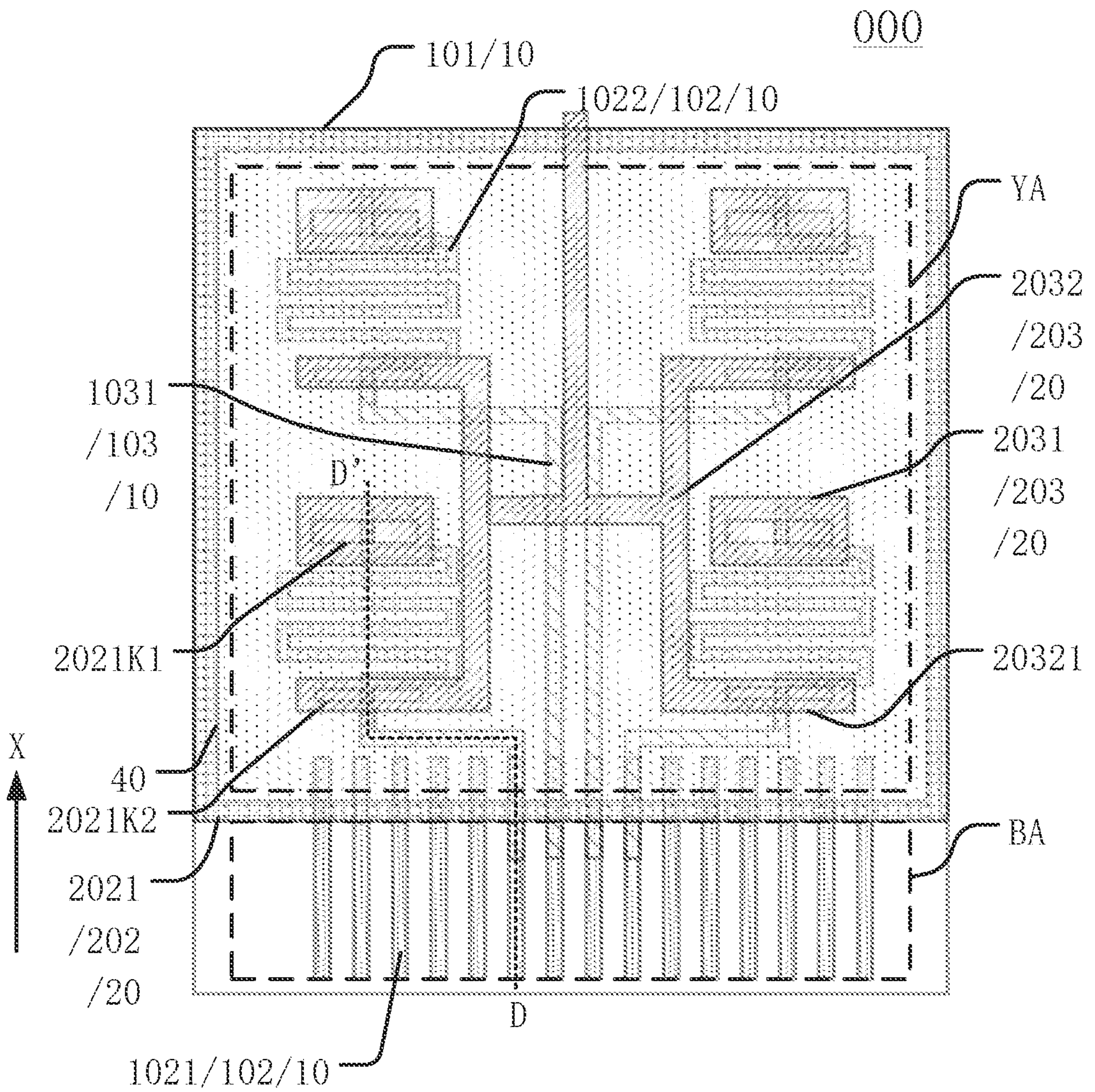
FIG. 8 illustrates a planar structure of another exemplary antenna consistent with various disclosed embodiments of the present disclosure.
Figure 9:
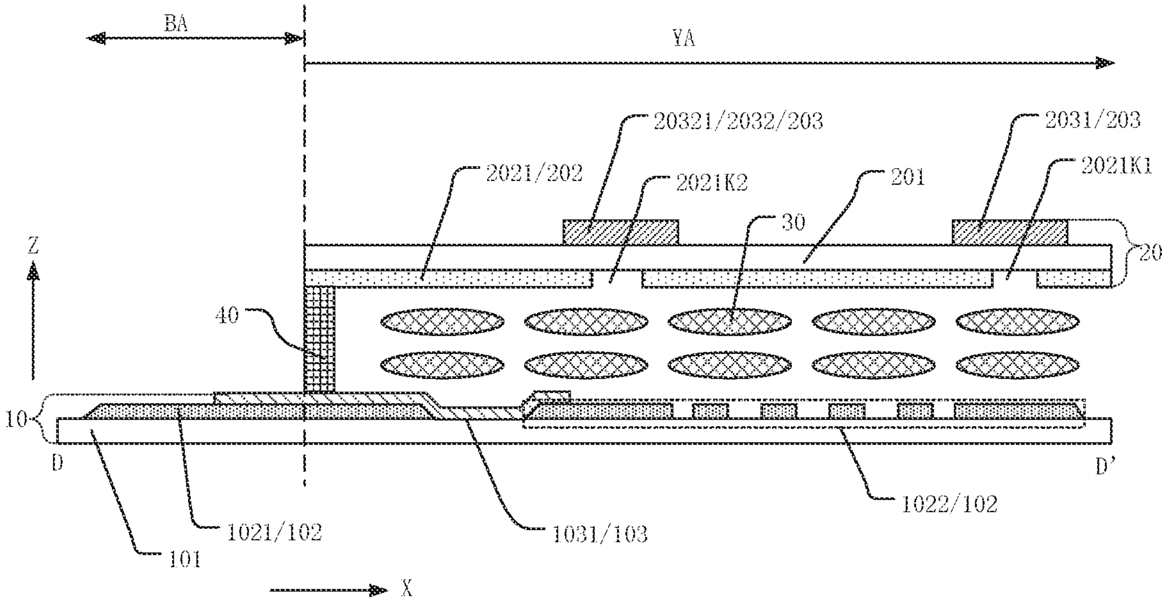
FIG. 9 illustrates a cross-sectional view along a D-D' direction in FIG. 8, consistent with various disclosed embodiments of the present disclosure.

In some embodiments shown in FIG. 8 which is another planar structure of the antenna and FIG. 9 is a cross-sectional view along the D-D' direction in FIG. 8, the orthographic projection of the plurality of conductive pads 1021 on the first substrate 101 may at least partially overlap with the orthographic projection of the liquid crystal layer 30 on the first substrate 101.

In the present embodiment, the orthographic projection of the plurality of conductive pads 1021 on the first substrate 101 may at least partially overlap with the orthographic projection of the liquid crystal layer 30 on the first substrate 101. That is, at least a portion of the plurality of conductive pads 201 may be set to close to the direction of the phase shifter array area YA and extended to a region where the liquid crystal layer 30 at the periphery of the bonding area BA is located. By further extending the length of the plurality of conductive pads 1021 in the direction X from the bonding area BA to the phase shifter array area YA, the contact area between the plurality of bias voltage lines 1031 of the first conductive layer 103 and the plurality of conductive pads 1021 of the first metal layer 102 may be increased further, to further reduce the influence of the unreliable joint area on the overall electrical connection performance and improve the overall electrical connection reliability between the plurality of bias voltage lines 1031 and the plurality of conductive pads 1021. Also, by further extending the length of the plurality of conductive pads 1021 in the direction X from the bonding area BA to the phase shifter array area YA, at least more areas of the plurality of extended conductive pads 1021 may be free from the pressure caused by the subsequent bonding of the driving chip or the flexible circuit board. Therefore, even if a portion of the plurality of bias voltage lines 1031 in the bonding area BA during bonding is affected by the pressure of the ACF glue to produce cracks, at least the extended sections of the plurality of conductive pads 1021 outside the bonding area BA may be form a good electrical connection with the plurality of bias voltage lines 1031, reducing the degree of influence of the bonding pressure on the cracking of the transparent conductive material and reducing the influence on the electrical connection between at least some sections of the plurality of bias voltage lines and the plurality of conductive pads 1021. Reliability of the electrical connection when one of the plurality of bias voltage lines 1031 climbs at one end of a corresponding one of the conductive pads 1021.

Figure 10:
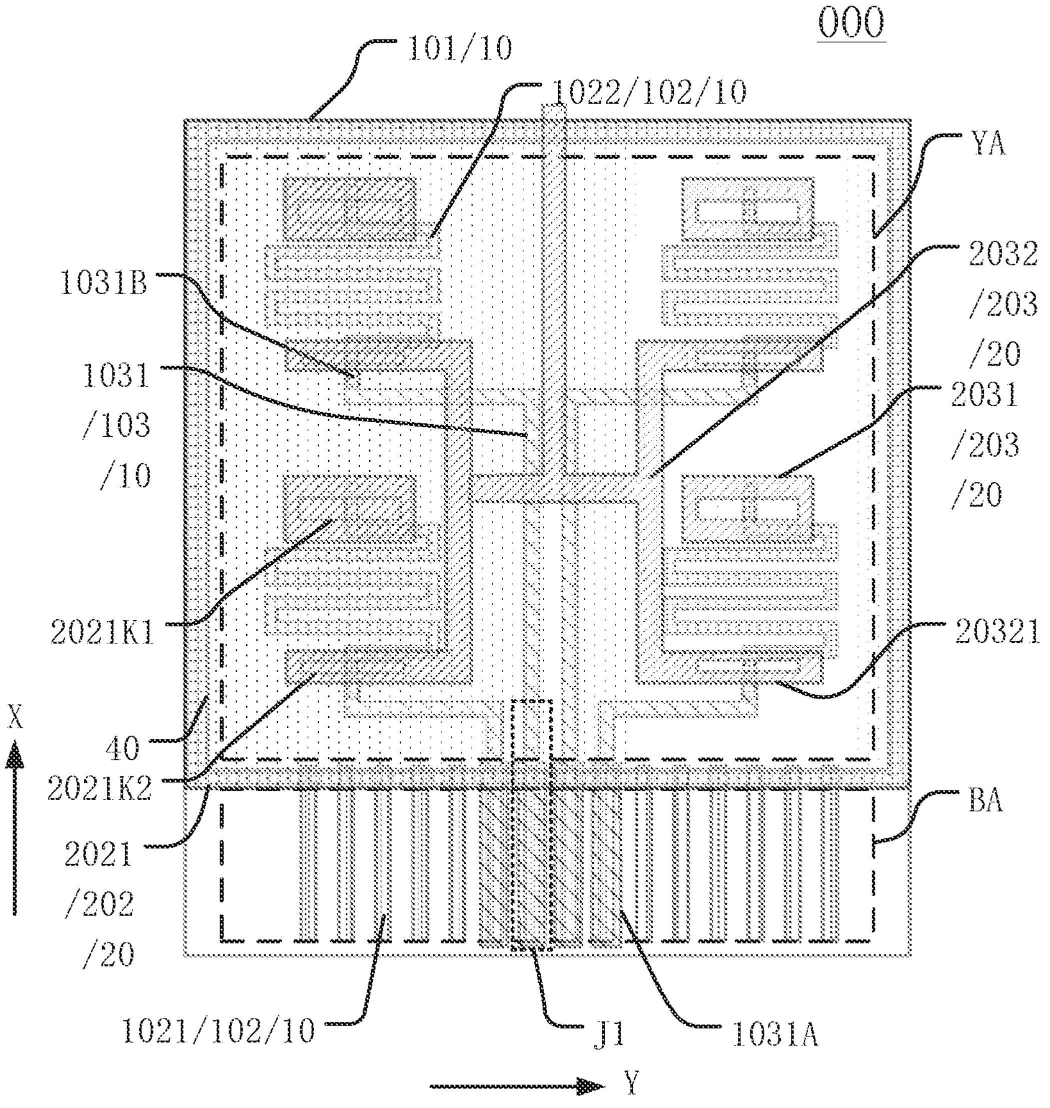
FIG. 10 illustrates a planar structure of another exemplary antenna consistent with various disclosed embodiments of the present disclosure.
Figure 11:
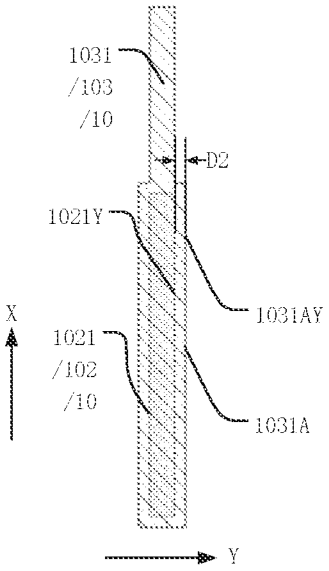
FIG. 11 illustrates an enlarged view of a first metal layer and a first conductive layer in a J1 region in FIG. 10, consistent with various disclosed embodiments of the present disclosure.

In some embodiments, shown in FIG. 10 which is another planar structure of the antenna and FIG. 11 which is an enlarged view of the first metal layer and the first conductive layer in the J1 region of FIG. 10, one bias voltage line 1031 of the plurality of bias voltage lines 1031 may include a first subsection 1031A and a second subsection 1031B. The first subsection 1031A and the second subsection 1031B may be respectively located at two ends of the bias voltage line 1031. In the direction perpendicular to the plane where the first substrate 101 is located, in the bias voltage line 1031, the first subsection 1031A may overlap one corresponding conductive pad 1021, and the second subsection 1031B may partially overlap one corresponding phase shifter unit 1022.

In the direction perpendicular to the plane where the first substrate 101 is located, in the bias voltage line 1031, the first subsection 1031A may overlap the corresponding conductive pad 1021.

The area of the orthographic projection of the first subsection 1031A on the first substrate 101 may be larger than the area of the orthographic projection of the corresponding conductive pad 1021 on the first substrate 101.

In the present embodiment, the bias voltage line 1031 may include the first subsection 1031A and the second subsection 1031B. The first subsection 1031A may be understood as a partial section overlapping with the corresponding conductive pad 1021, and the second subsection 1031B may be understood as a partial section overlapping with the corresponding phase shifter unit 1022. That is, the first subsection 1031A and the second subsection 1031B may be located at two ends of the bias voltage line 1031 respectively, to electrically connect one conductive pad 1021 to one corresponding phase shifter unit 1022 of the microstrip line structure through at least one bias voltage line 1031. Further, In the direction perpendicular to the plane where the first substrate 101 is located, in the bias voltage line 1031, the first subsection 1031A may overlap the corresponding conductive pad 1021. The area of the orthographic projection of the first subsection 1031A on the first substrate 101 may be larger than the area of the orthographic projection of the corresponding conductive pad 1021 on the first substrate 101. Therefore, the first subsection 1031A of the first conductive layer 103 may cover a partial area of the corresponding conductive pad 1021 in the first metal layer 102, such that the area of the ramping electrical connection of the first subsection 1031A with the corresponding conductive pad 1021 may be increased to further effectively enhance the reliability of the electrical connection.

In some embodiments shown in FIG. 10 and FIG. 11, a minimum distance D2 between the edge of the first subsection 1031A of the bias voltage line 1031 and the edge of the corresponding conductive pad 1021 may be about 2 μm to about 20 μm.

In the present embodiment, the area of the orthographic projection of the first subsection 1031A on the first substrate 101 may be larger than the area of the orthographic projection of the corresponding conductive pad 1021 on the first substrate 101. The first subsection 1031A may overlap the corresponding conductive pad 1021, and the minimum distance D2 between the edge of the first subsection 1031A of the bias voltage line 1031 and the edge of the corresponding conductive pad 1021 may be about 2 μm to about 20 μm. The minimum distance D2 from the edge of the first subsection 1031A to the edge of the corresponding conductive pad 1021 may be understood as a distance from the edge 1031AY of the first subsection 1031A to the edge 1021Y of the closest conductive pad 1021 among the overlapping conductive pad 1021 and the first subsection 1031A along a direction Y of the arrangement of the plurality of conductive pads 1021. When the driving chip or flexible circuit board is subsequently bound in the bonding area BA, it is necessary to ensure that the distance between two adjacent conductive pads 1021 is larger than 40 um along the arrangement direction Y of the plurality of conductive pads 1021, to avoid the short circuit problem because of a two small distance between adjacent conductive pads 1021. The orthographic projection area of the first sub-section 1031A on the first substrate 101 may be set to be larger than the orthographic projection area of the conductive pad 1021 on the first substrate 101, the first sub-section 1031A may cover the conductive pad 1021 to protect the entire conductive pad 1021 and prevent the conductive pad 1021 of copper metal material from being damaged by water and oxygen corrosion. Also, the minimum distance D2 from the edge of the first subsection 1031A of the bias voltage line 1031 to the edge of the conductive pad 1021 may be set to about 2 μm to about 20 μm, that is, the edge of the first subsection 1031A may exceed the edge of the nearest conductive pad 1021 by about 2 μm to about 20 μm. Therefore, the distance between the conductive areas of the conductive pads 1021 covered by the first subsection 1031A, that is, the distance between two adjacent conductive pads 1021, may be ensured to be larger than 40 μm. Signal interference caused by the short distance between the first sub-sections 1031A corresponding to two adjacent conductive pads 1021 and the risk of short circuit may be prevented.

In some embodiments, to further increase the area of the ramping electrical connection of the first subsection 1031A with the corresponding conductive pad 1021, along the direction X from the bonding area BA to the phase shifter array area YA, the first subsection 1031A may also have a part beyond the two ends of the corresponding conductive pad 1021, as shown in FIG. 11. That is, the first subsection 1031A may exceed the edge of the corresponding conductive pad 1021 at the surroundings of the conductive pads 1021, which is beneficial to further enhance the reliability of the electrical connection.

Figure 12:
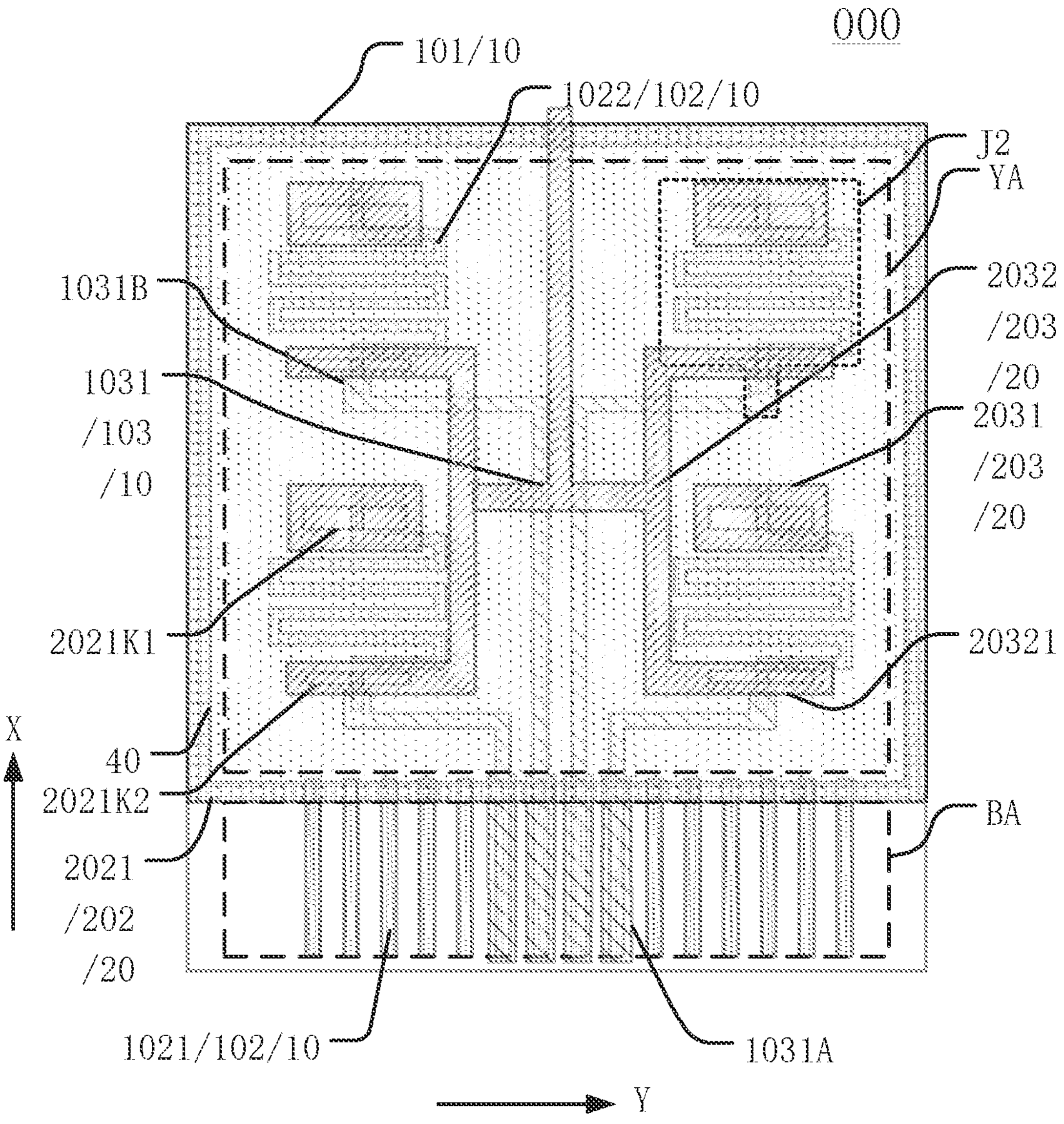
FIG. 12 illustrates a planar structure of another exemplary antenna consistent with various disclosed embodiments of the present disclosure.
Figure 13:
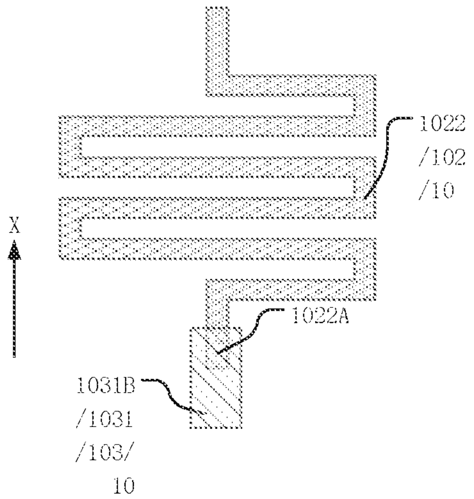
FIG. 13 illustrates an enlarged view of a first metal layer and a first conductive layer in a J2 region in FIG. 12, consistent with various disclosed embodiments of the present disclosure.

In some embodiments, shown in FIG. 12 which is another planar structure of the antenna and FIG. 13 which is an enlarged view of the first metal layer and the first conductive layer in the J2 region of FIG. 12, one phase shifter unit 1022 of the plurality of phase shifter units 1022 may include a first end 1022A. In the direction perpendicular to the plane where the first substrate 101 is located, the second subsection 1031B may cover the first end 1022A, and the area of the orthographic projection of the second subsection 1031B on the first substrate 101 may be larger than the area of the orthographic projection of the first end 1022A on the first substrate 101.

In the present embodiment, one bias voltage line 1031 may include the first subsection 1031A and the second subsection 1031B. The first subsection 1031A may be understood as a partial section overlapping with the corresponding conductive pad 1021, and the second subsection 1031B may be understood as a partial section overlapping with the corresponding phase shifter unit 1022. That is, the first subsection 1031A and the second subsection 1031B may be located at two ends of the bias voltage line 1031 respectively, to electrically connect one conductive pad 1021 to one corresponding phase shifter unit 1022 of the microstrip line structure through at least one bias voltage line 1031. Further, one phase shifter unit 1022 of the plurality of phase shifter units 1022 may include a first end 1022A. The first end 1022A may be the end region where the phase shifter unit 1022 overlaps with the second sub-section 1031B. In the direction perpendicular to the plane where the first substrate 101 is located, the second subsection 1031B may cover the first end 1022A. By setting the orthographic area of the second subsection 1031B on the first substrate 101 to be larger than the orthographic area of the first end 1022A of the phase shifter unit 1022 of the microstrip line structure on the first substrate 101, the second subsection 1031B of the first conductive layer 103 may cover the first end 1022A of the phase shifter unit 1022 of the first metal layer 102, such that the area of the ramping electrical connection of the second subsection 1031B and the phase shifter unit 1022 of the microstrip line structure may be effectively increased to more effectively enhance the reliability of the electrical connection.

In some embodiments, the range where the edge of the second subsection 1031B exceeds the edge of the overlapping first end 1022A may refer to the arrangement of the first subsection 1031A and the conductive pad 1021 in the above-mentioned embodiment, which may also enhance the reliability of the electrical connection.

Figure 14:
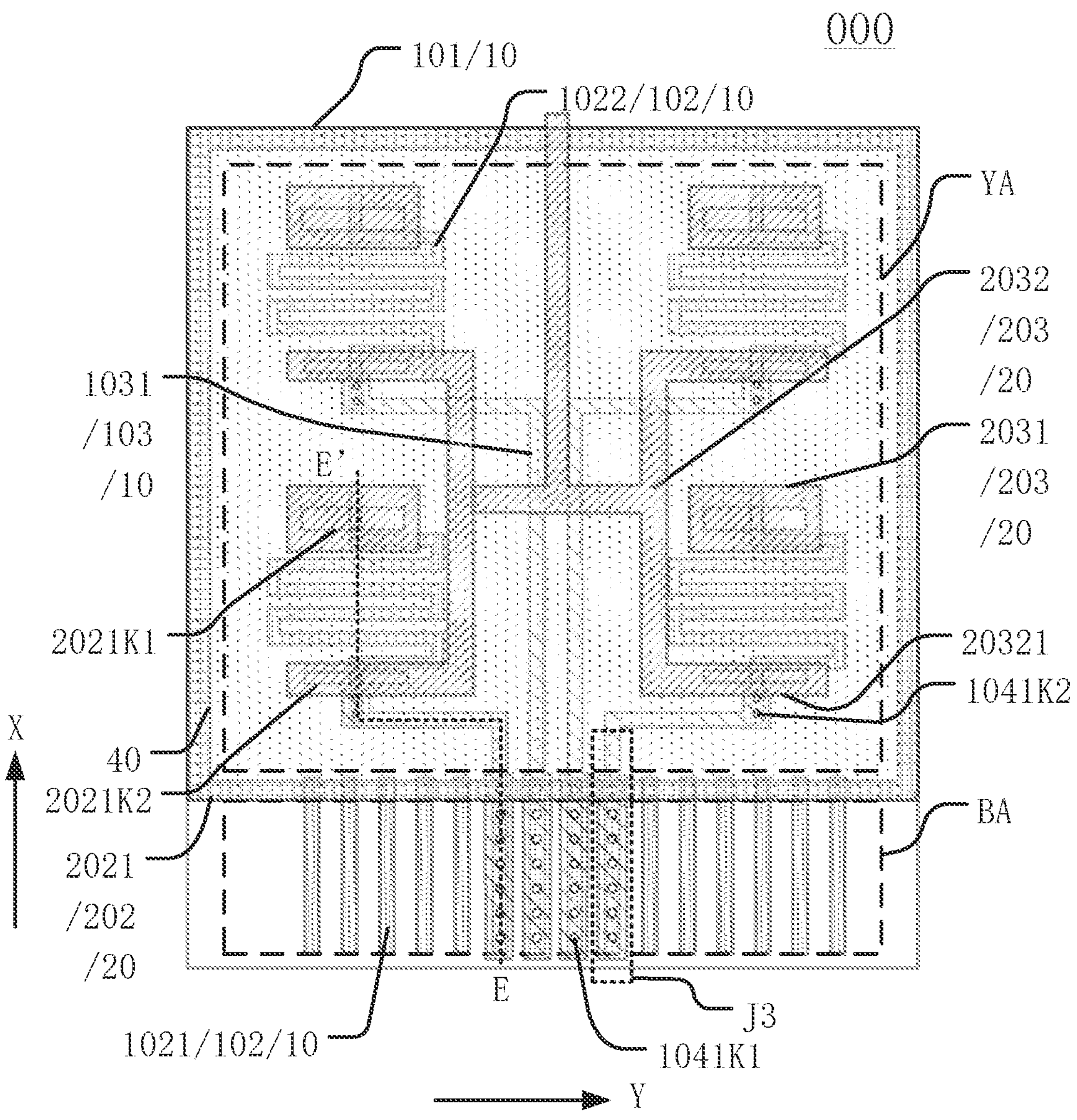
FIG. 14 illustrates a planar structure of another exemplary antenna consistent with various disclosed embodiments of the present disclosure.
Figure 15:
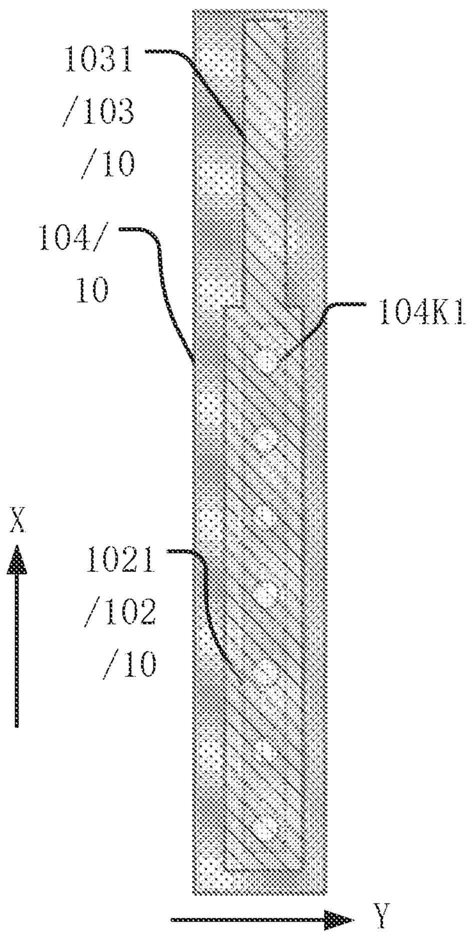
FIG. 15 illustrates an enlarged view of a first metal layer, a first insulating layer, and a first conductive layer in a J3 region in FIG. 14, consistent with various disclosed embodiments of the present disclosure.
Figure 16:
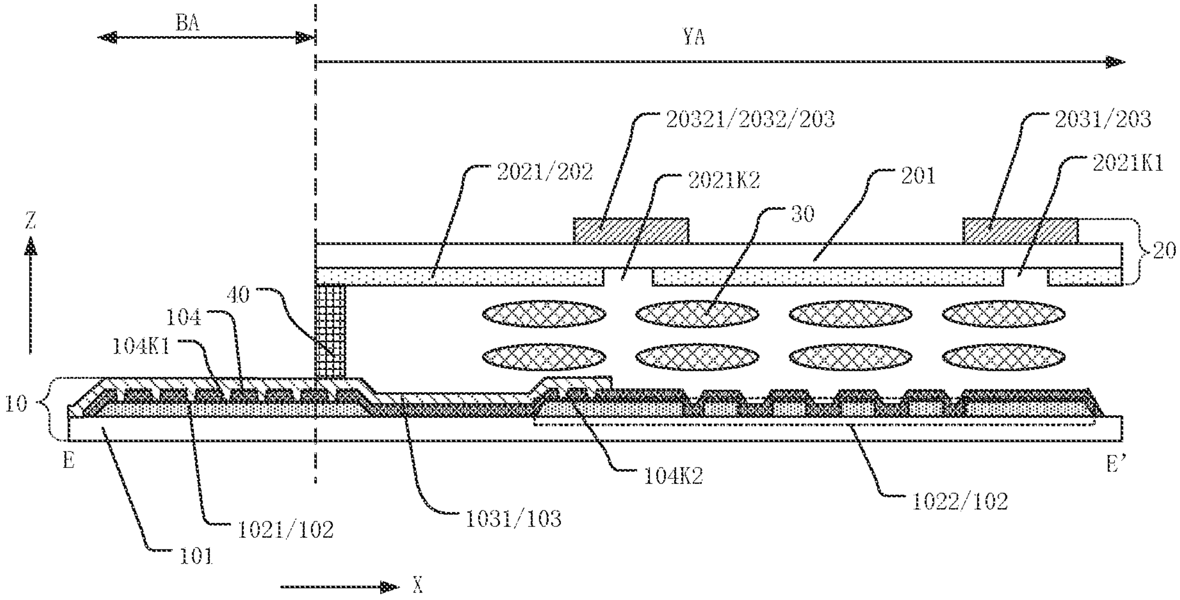
FIG. 16 illustrates a cross-sectional view along an E-E' direction in FIG. 14, consistent with various disclosed embodiments of the present disclosure.

In some embodiments, shown in FIG. 14 which is another planar structure of the antenna, FIG. 15 which is an enlarged view of the first metal layer, the first insulating layer, and the first conductive layer in the J3 region of FIG. 14, and FIG. 16 which is a cross-sectional view along the E-E' direction in FIG. 14, a first insulating layer 104 may be disposed between the first metal layer 102 and the first conductive layer 103. The first insulating layer 104 may include a plurality of first through holes 104K1 and a plurality of second through holes 104K2.

The orthographic projection of one of the plurality of first through holes 104K1 on the first substrate 101 may be located within the range of the orthographic projection of a corresponding one of the plurality of conductive pads 1021 on the first substrate 101, and one of the plurality of bias voltage lines 1031 may be electrically connected to a corresponding one of the plurality of conductive pads 1021 through a corresponding one of the plurality of first through holes 104K1.

The orthographic projection of one of the plurality of second through holes 104K2 on the first substrate 101 may be located within the range of the orthographic projection of a corresponding one of the plurality of phase shifter units 1022 on the first substrate 101, and one of the plurality of bias voltage lines 1031 may be electrically connected to a corresponding one of the plurality of phase shifter units 1022 through a corresponding one of the plurality of second through holes 104K2.

The first insulating layer 104 may be made of a material including silicon nitride.

In the present embodiment, the first metal layer 102 for forming the plurality of conductive pads 1021 and the plurality of phase shifter units 1022 of the microstrip line structure may not be in direct contact with the plurality of bias voltage lines 1031 in the first conductive layer 103. For example, the first insulating layer 104 may be disposed between the first metal layer 102 and the first conductive layer 103, and the first insulating layer 104 may be made of a material including silicon nitride. After the first metal layer 102 is fabricated, various patterned structures, such as the plurality of conductive pads 1021 and the plurality of phase shifter units 1022 of the microstrip line structure, may be formed in the first metal layer 102 by an etching process. The first insulating layer 104 may be formed to cover. Through the setting of the first insulating layer 104, the top of the various patterned structures of the first metal layer 102 may be planarized to eliminate some spikes and undulating areas generated during the etching process of the patterned structures of the first metal layer 102. That is, planarization may be performed on the first metal layer 102. Therefore, when the plurality of bias voltage lines 1031 of the first conductive layer 103 formed subsequently is electrically connected to the plurality of conductive pads 1021 and the plurality of phase shifter units 1022 of the microstrip line structure through the ramp, the smoothness of the ramp may be improved, thereby avoiding the disconnection problem during ramping. Further, in this embodiment, the first insulating layer 104 may include the plurality of first through holes 104K1 and the plurality of second through holes 104K2. The plurality of first through holes 104K1 and the plurality of second through holes 104K2 may penetrate through the thickness of the first insulating layer 104. The orthographic projection of one of the plurality of first through holes 104K1 on the first substrate 101 may be located within the range of the orthographic projection of a corresponding one of the plurality of conductive pads 1021 on the first substrate 101. One bias voltage line 1031 of the plurality of bias voltage lines 1031 may be electrically connected to a corresponding conductive pad 1021 of the plurality of conductive pads 1021 through a corresponding first through hole 104K1 of the plurality of first through holes 104K1. After one end of the bias voltage line 1031 climbs up to the top of the first insulating layer 104 and overlaps the corresponding conductive pad 1021, the material of the bias voltage line 1031 may be in contact with the corresponding conductive pad 1021 through the corresponding first through hole 104K1, to realize the electrical connection effect between one end of the bias voltage line 1031 and the corresponding conductive pad 1021. The orthographic projection of one of the plurality of second through holes 104K2 on the first substrate 101 may be located within the range of the orthographic projection of a corresponding one of the plurality of phase shifter units 1022 on the first substrate 101. One bias voltage line 1031 of the plurality of bias voltage lines 1031 may be electrically connected to a corresponding phase shifter unit 1022 of the plurality of phase shifter units 1022 through a corresponding second through hole 104K2 of the plurality of second through holes 104K2. After one end of the bias voltage line 1031 climbs up to the top of the first insulating layer 104 and overlaps the corresponding phase shifter unit 1022, the material of the bias voltage line 1031 may be in contact with the corresponding phase shifter unit 1022 through the corresponding second through hole 104K2, to realize the electrical connection effect between one end of the bias voltage line 1031 and the corresponding phase shifter unit 1022. The smoothness of the bias voltage line 1031 when ramping may be improved to avoid disconnection, and the reliability of the electrical connection between the bias voltage line 1031 and the corresponding conductive pad 1021 and the corresponding phase shifter unit 1022 respectively may be improved.

In one embodiment, the first insulating layer 104 may be made of silicon nitride. In some other embodiments, the first insulating layer 104 may be also made of a material including a composite material of an organic material and silicon nitride; or an organic planarization material of a composite material of an organic material and silicon nitride, or other laminated materials with planarization function composed of multiple materials, which is not limited in the present disclosure and may be selected and set according to actual needs during specific implementation.

The embodiment where the plurality of first through holes 104K1 and the plurality of second through holes 104K2 are circular is used as an example to illustrate the present disclosure only, and do not limit the scope of the present disclosure. The number and shape of the plurality of first through holes 104K1 and the plurality of second through holes 104K2 opened in the first insulating layer 104 are not specifically limited here. The plurality of first through holes 104K1 and the plurality of second through holes 104K2 may be some other shapes, as long as there is the plurality of first through holes 104K1 in the overlapping range of the plurality of bias voltage lines 1031 and the plurality of conductive pads 1021 and there are the plurality of second through holes 104K2 in the overlapping area of the plurality of bias voltage lines 1031 and the plurality of phase shifter units 1022 to realize the stable electrical connection effect.

Figure 17:
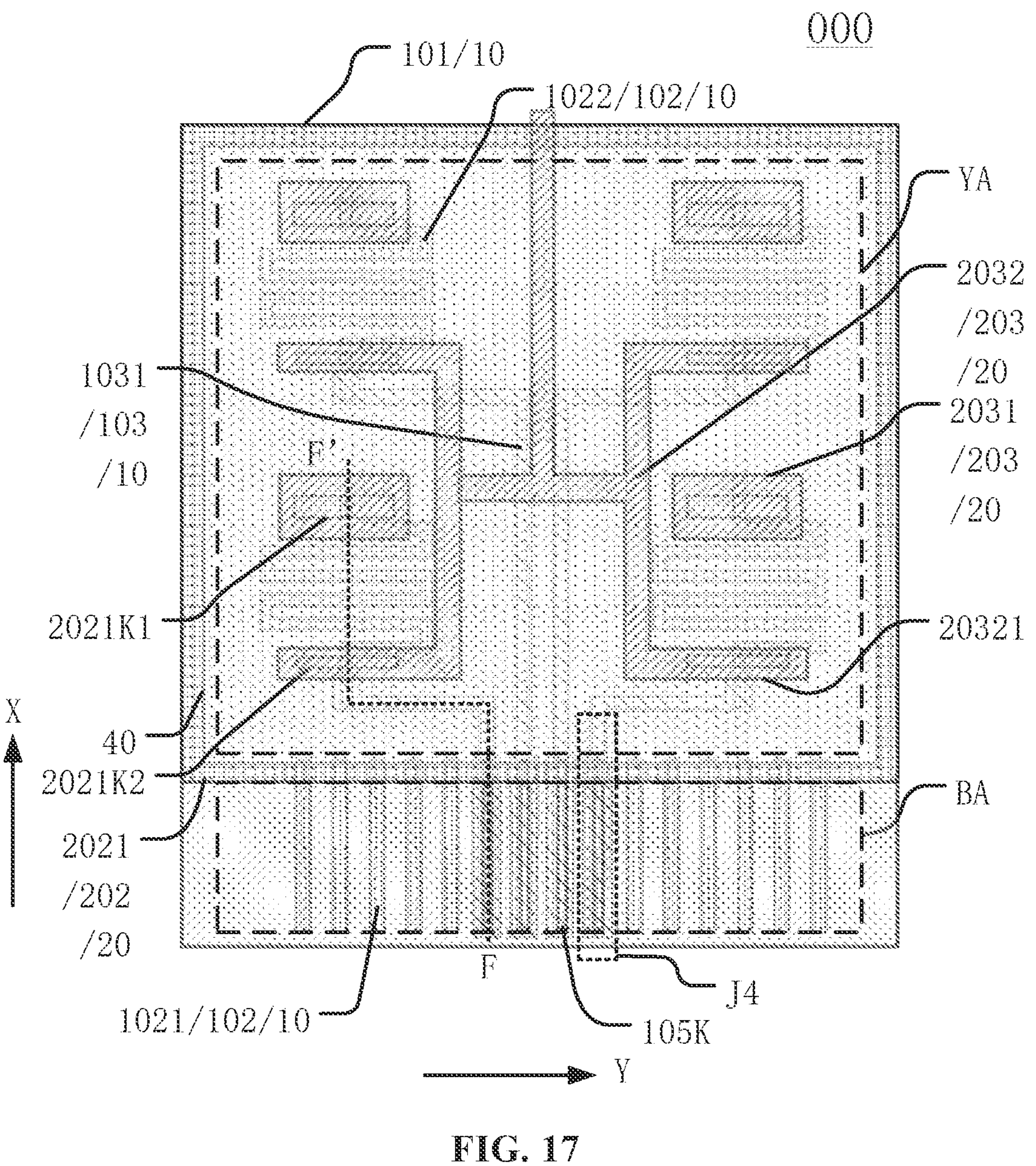
FIG. 17 illustrates a planar structure of another exemplary antenna consistent with various disclosed embodiments of the present disclosure.
Figure 18:
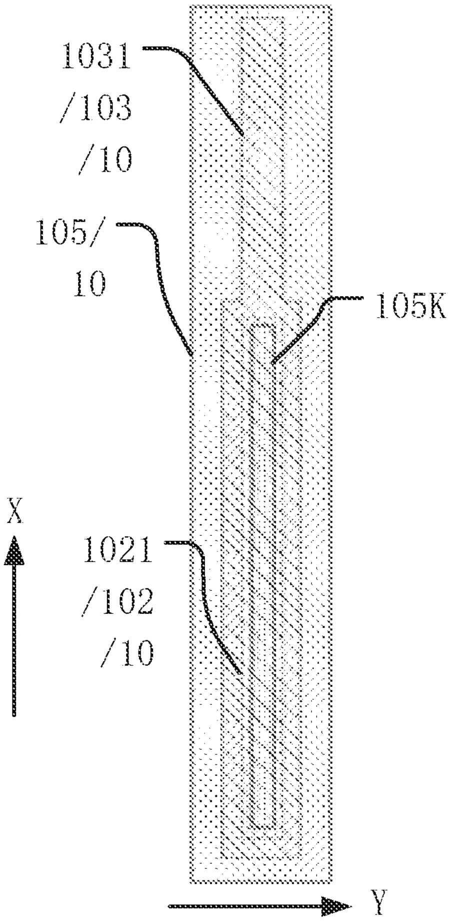
FIG. 18 illustrates an enlarged view of a first metal layer, a first insulating layer, and a second conductive layer in a J4 region in FIG. 17, consistent with various disclosed embodiments of the present disclosure.
Figure 19:
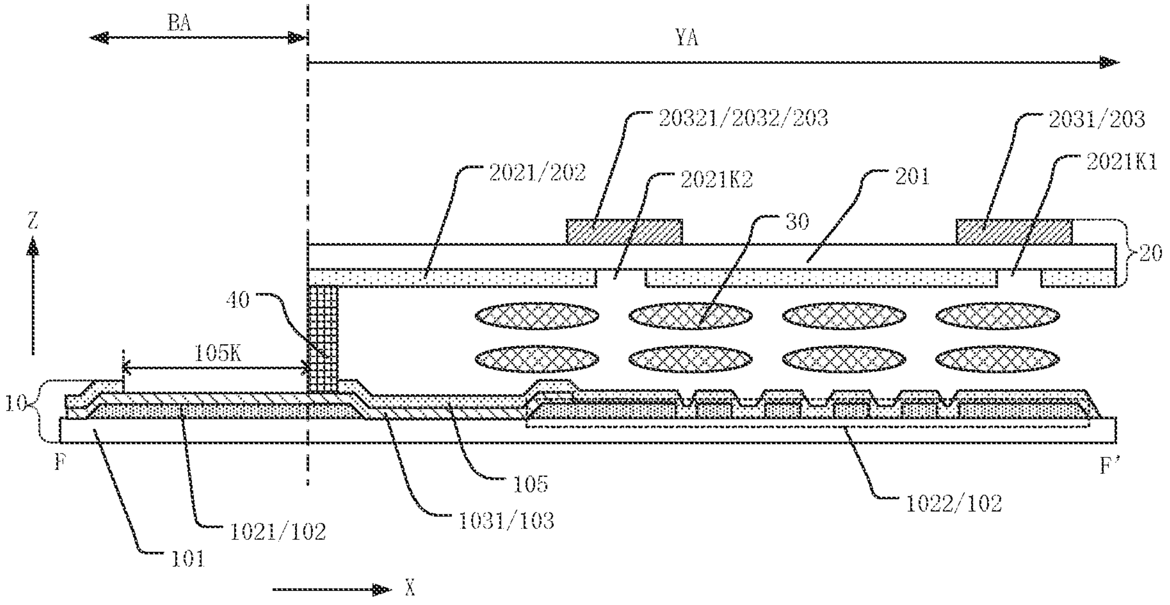
FIG. 19 illustrates a cross-sectional view along an F-F' direction in FIG. 17, consistent with various disclosed embodiments of the present disclosure.

In some embodiments, shown in FIG. 17 which is another planar structure of the antenna, FIG. 18 which is an enlarged view of the first metal layer, the first insulating layer, and the first conductive layer in the J4 region of FIG. 17, and FIG. 19 which is a cross-sectional view along the E-E' direction in FIG. 17, a second insulating layer 105 may be disposed on a side of the first conductive layer 103 away from the first substrate 101. The second insulating layer 105 may include a plurality of hollow parts 105K, and the plurality of hollow parts 105K may penetrate through the second insulating layer 105 in the direction Z perpendicular to the plane of the first substrate 101.

In the present embodiment, the second insulating layer 105 may be disposed on a side of the first conductive layer 103 away from the first substrate 101. The second insulating layer 105 may be made of a material including silicon nitride. The second insulating layer 105 may be used for protecting the first conductive layer 103 and the first metal layer 102. In this embodiment, the second insulating layer 105 may include the plurality of hollow parts 105K, and the plurality of hollow parts 105K may penetrate through the second insulating layer 105 in the direction Z perpendicular to the plane of the first substrate 101. A portion of the first conductive layer 103 below the second insulating layer 105 may be exposed by the plurality of hollow parts 105K, which is convenient for bonding and electrical connection between the first conductive layer 103 at the position of the plurality of hollow parts 105K (such as the position of the plurality of conductive pads 1021 of the bonding area BA)

and the driver chip or the flexible circuit board. In this embodiment, the first conductive layer 103 may be in direct contact with the first metal layer 102, which is beneficial to enhance the electrical connection effect between the plurality of bias voltage lines 1031 and the plurality of conductive pads 1021, and the plurality of bias voltage lines 1031 and the plurality of phase shifter units 1922.

In one embodiment, the second insulating layer 105 may be made of silicon nitride. In some other embodiments, the second insulating layer 105 may be also made of a material including a composite material of an organic material and silicon nitride; or an organic planarization material of a composite material of an organic material and silicon nitride, or other laminated materials with protection function composed of multiple materials, which is not limited in the present disclosure and may be selected and set according to actual needs during specific implementation.

In some embodiments shown in FIG. 17 to FIG. 19, the orthographic projection of one hollow part 105K of the plurality of hollow parts 105K on the first substrate 101 may be located within the range of the orthographic projection of a corresponding conductive pad 1021 of the plurality of conductive pads 1021 on the first substrate 101, and one hollow part 105K of the plurality of hollow parts 105K in the second insulating layer 105 may expose a portion of a corresponding bias voltage line 1031. That is, when one bias voltage line 1031 of the plurality of bias voltage lines 1031 in the first conductive layer 103 covers a corresponding conductive pad 1021 of the plurality of conductive pads 1021 overlapping the bias voltage line 1031, the orthographic projection of the hollow part 105K on the first substrate 101 may be located within the range of the orthographic projection of the conductive pad 1021 on the first substrate 101, such that the hollow part 105K in the second insulating layer 105 exposes a portion of the bias voltage line 1031 above the conductive pad 1021, which is convenient for subsequent bonding of a driver chip or a flexible circuit board at the position of the hollow part 105K. Therefore, the subsequently bonded driver chip or flexible circuit board may be better electrically connected to the conductive pad 1021.

For description purposes only, the embodiment where the shape of the plurality of hollow parts 105K and the plurality of conductive pads 1021 are all bar is used as an example for illustrating the present disclosure, and the present disclosure does not limit the shape and size of the plurality of hollow parts 105K. The size of the plurality of hollow parts 105K may be configured according to the size setting of the plurality of conductive pads 1021. For example, the plurality of hollow parts 105K may be set smaller than the plurality of conductive pads 1021, to expose part of the plurality of bias voltage lines 1031 in the first conductive layer 103 at the positions of the plurality of conductive pads 1021, which is convenient for subsequent bonding.

Figure 20:
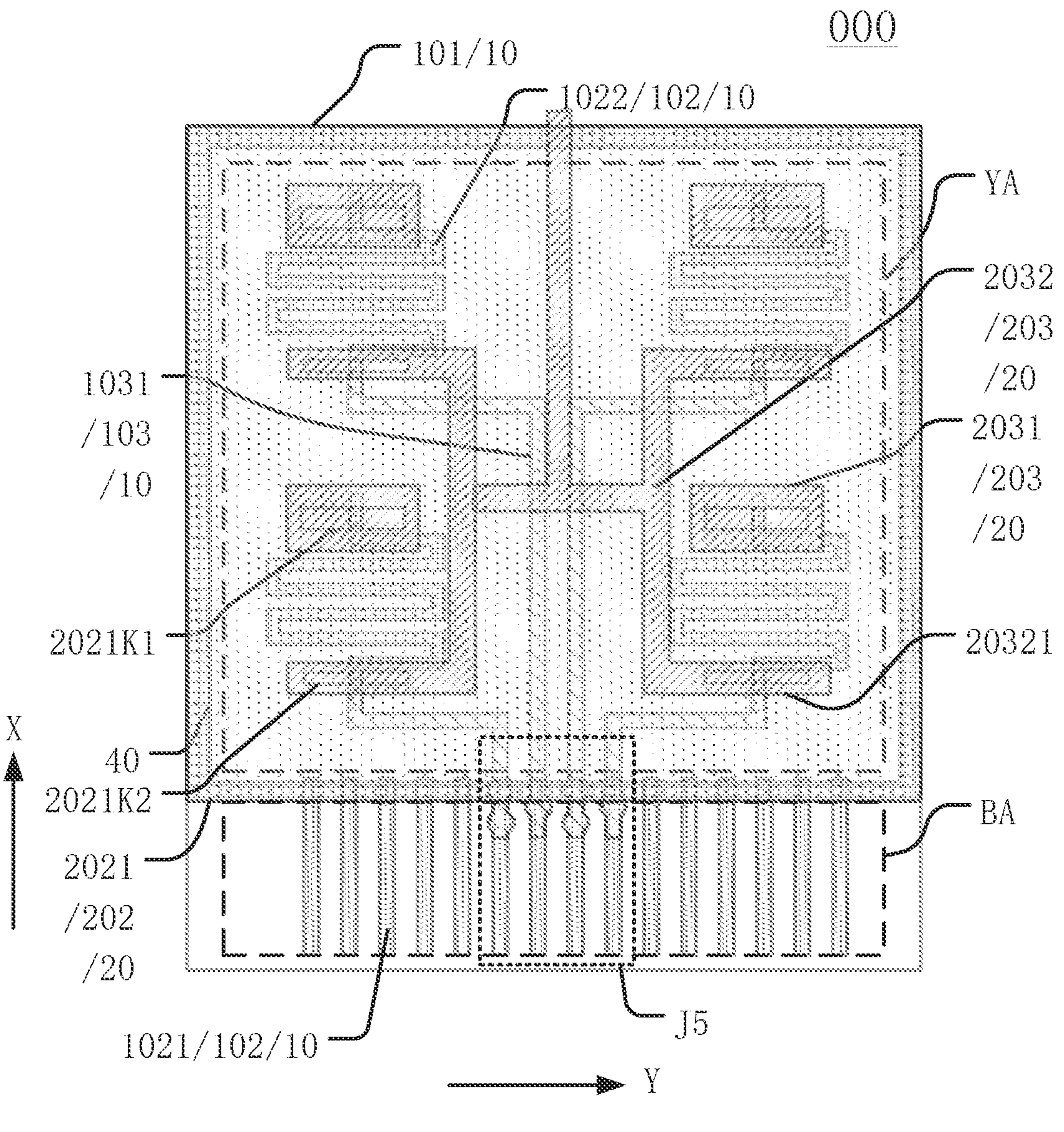
FIG. 20 illustrates a planar structure of another exemplary antenna consistent with various disclosed embodiments of the present disclosure.
Figure 21:
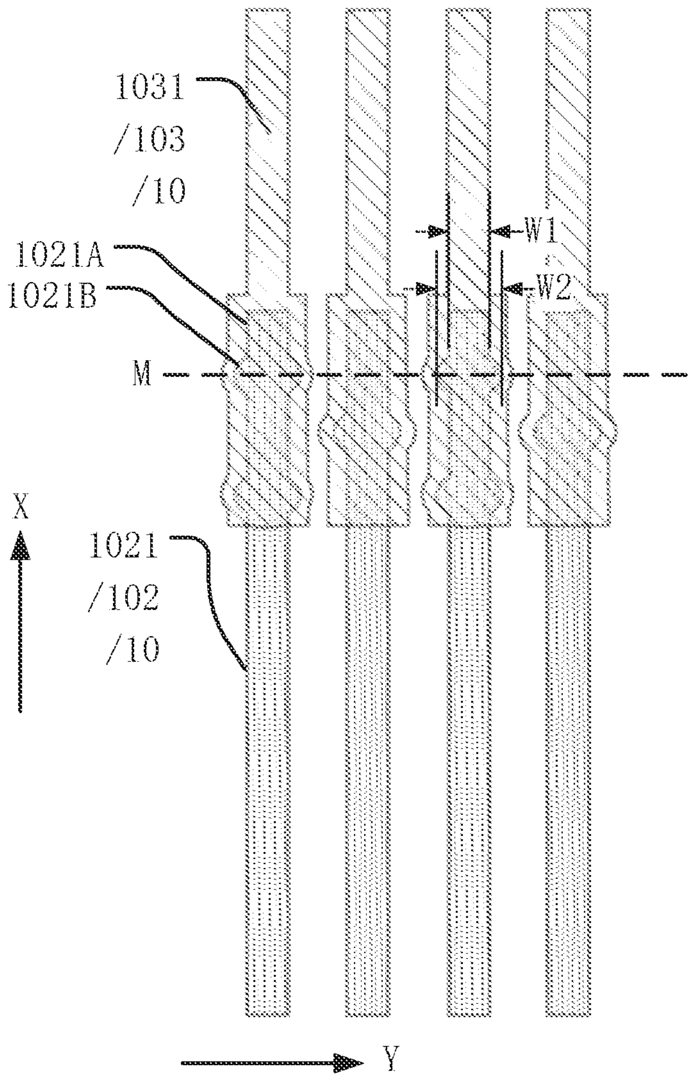
FIG. 21 illustrates an enlarged view of a first metal layer and a first conductive layer in a J5 region in FIG. 20, consistent with various disclosed embodiments of the present disclosure.

In some embodiments shown in FIG. 20 which is another planar structure of the antenna and FIG. 21 which is an enlarged view of the first metal layer and the first conductive layer in the J5 region of FIG. 20, each of at least some of the plurality of conductive pads 1021 may include a first part 1021A and a second part 1021B. The first part 1021A and the second part 1021B may be arranged along the direction X from the bonding area BA to the phase shifter array area YA.

Along a first direction Y, the outer diameter W2 of the second part 1021B may be larger than the outer diameter W1 of the first part 1021A, where the first direction Y is perpendicular to the direction X from the bonding area BA to the phase shifter array area YA.

In the present embodiment, among the plurality of conductive pads 1021 in the bonding area BA, each conductive pad 1021 of at least some conductive pads 1021 (such as a part of the plurality of conductive pads 1021 electrically connected to the plurality of bias voltage lines 1031) may include the first part 1021A and the second part 1021B. The first part 1021A and the second part 1021B may be understood as different segments of the same conductive pad 1021 arranged along the direction X from the bonding area BA to the phase shifter array area YA. Along the first direction Y (the first direction Y is perpendicular to the direction X from the bonding area BA to the phase shifter array area YA, that is, the first direction may be the arrangement direction Y of a plurality of conductive pads 1021), the outer diameter W2 of the second part 1021B may be larger than the outer diameter W1 of the first part 1021A. By widening and thicken a portion of the conductive pad 1021, the part of the overlapping bias voltage line 1031 may be also thickened and widened for special-shaped treatment, thereby covering a portion of the conductive pad 1021 at the position of the second part 1021B. Therefore, the reliability of the electrical connection between the bias voltage line 1031 and the conductive pad 1021 may be further enhanced by increasing the contact area between the bias voltage line 1031 and the conductive pad 1021.

In some embodiments shown in FIG. 20 and FIG. 21, two second parts 1021B of two adjacent conductive pads 1021 may be staggered from each other. That is, along the first direction Y, the two second parts 1021B of two adjacent conductive pads 1021 may be not at the same height indicated by the dotted line M in the figure, which in turn helps to prevent the thickened and widened second parts 1021B from being too close to affect the insulation effect between adjacent conductive pads 1021 and to prevent two adjacent conductive pads 1021 from interfering with each other.

In one embodiment shown in FIG. 20 and FIG. 21, the second part 1021B may be located at one end of the conductive pad 1021 along the direction X from the bonding area BA to the phase shifter array area YA. In some other embodiments shown in FIG. 22 which is another planar structure of the antenna and FIG. 23 which is an enlarged view of the first metal layer and the first conductive layer in the J6 region of FIG. 22, the second part 1021B may be located in the middle of the conductive pad 1021 along the direction X from the bonding area BA to the phase shifter array area YA. The thickened and widened second part 1021B of the conductive pad 1021 may be located at one end of the conductive pad 1021 (a side of the conductive pad 1021 close to the bias voltage line 1031 in FIG. 21), such that the electrical connection between the conductive pad 1021 and the bias voltage line 1031 may be improved through increasing the contact area. In the embodiment shown in FIG. 23, when one end of the bias voltage line 1031 completely cover the conductive pad 1022, the second part 1021B may be located in the middle of the conductive pad 1021, such that the electrical connection between the conductive pad 1021 and the bias voltage line 1031 may be improved through increasing the contact area.

Figure 22:
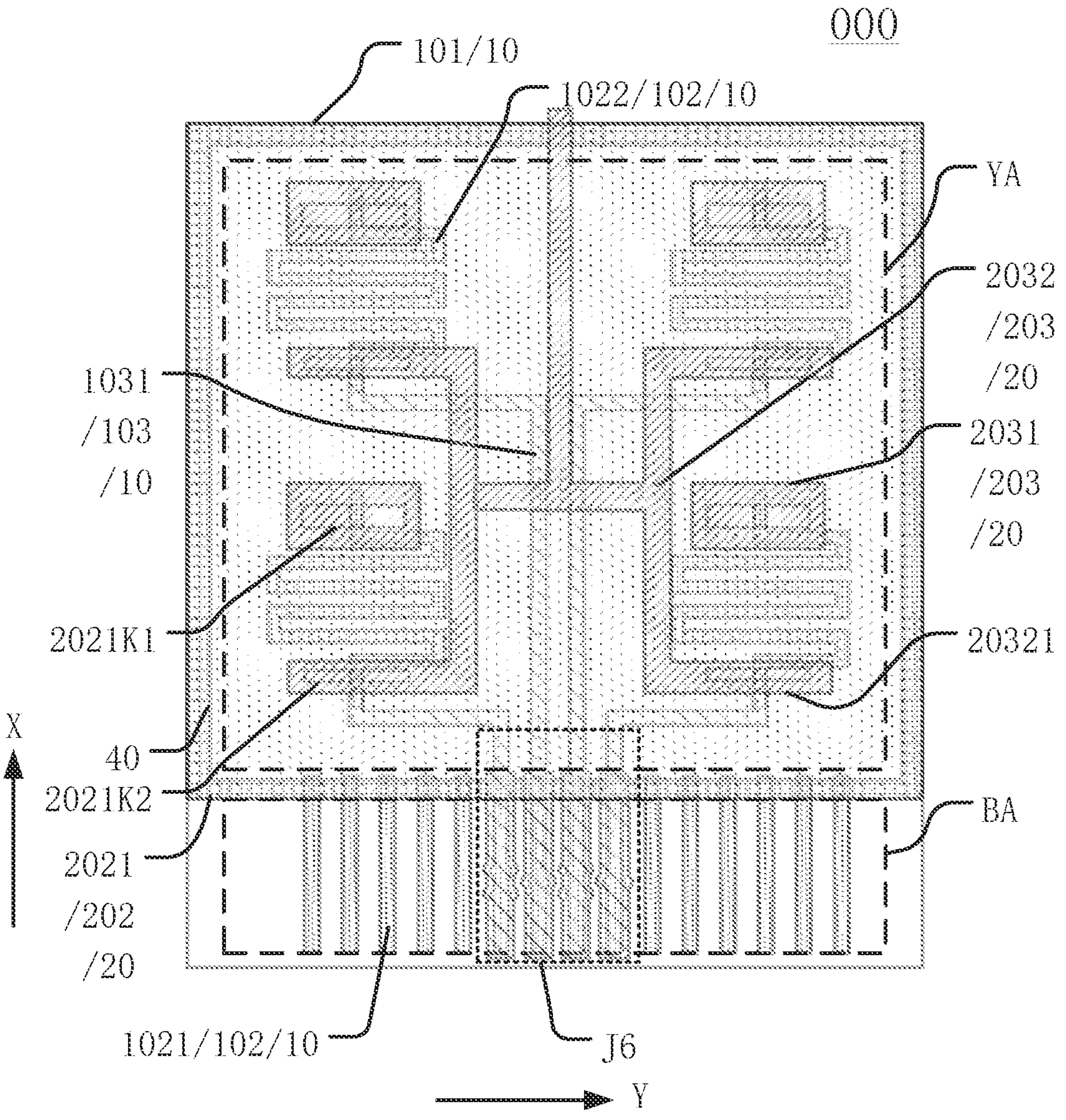
FIG. 22 illustrates a planar structure of another exemplary antenna consistent with various disclosed embodiments of the present disclosure.
Figure 23:
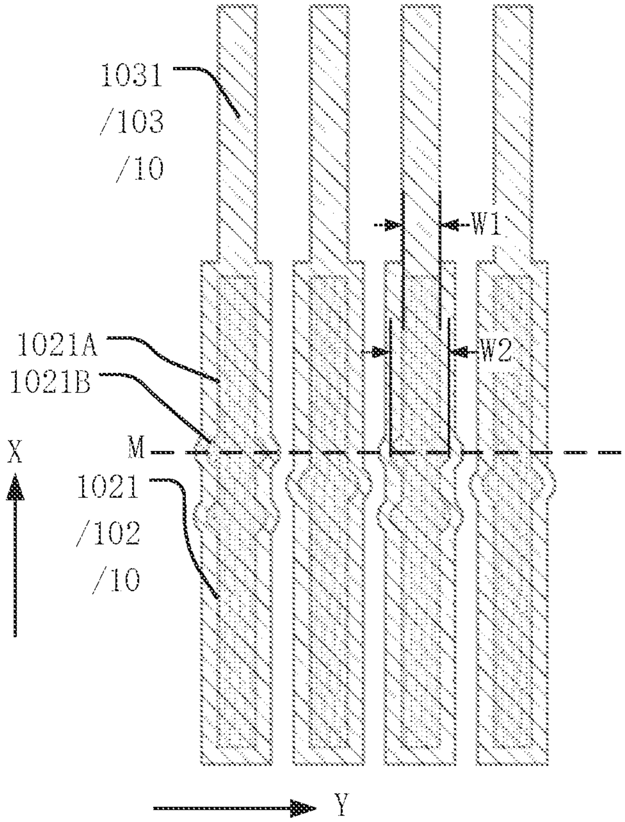
FIG. 23 illustrates an enlarged view of a first metal layer and a first conductive layer in a J6 region in FIG. 22, consistent with various disclosed embodiments of the present disclosure.
Figure 24:
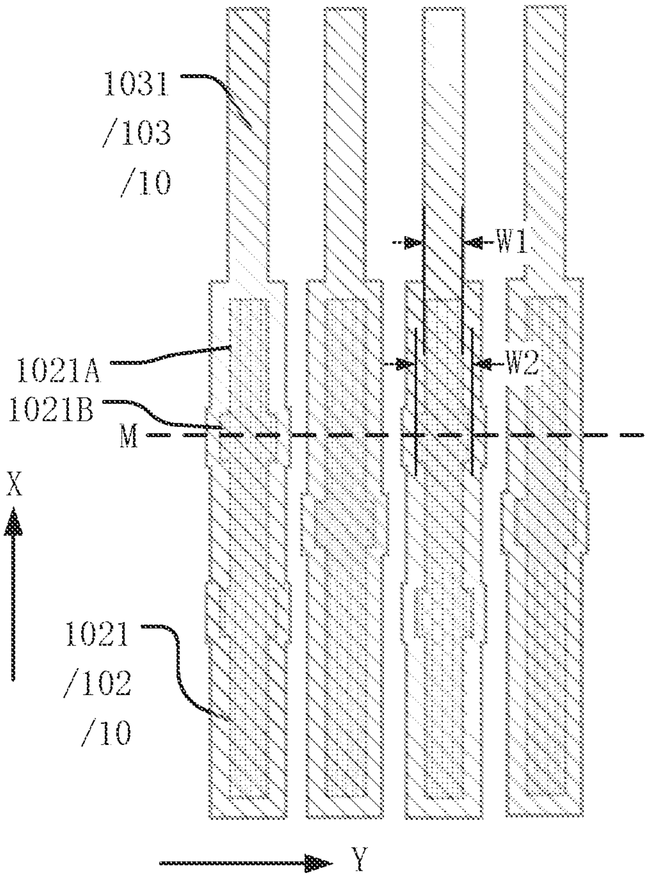
FIG. 24 illustrates another enlarged view of the first metal layer and the first conductive layer in the J6 region in FIG. 22, consistent with various disclosed embodiments of the present disclosure.

In some other embodiments shown in FIG. 22, FIG. 23, and FIG. 24 which is another enlarged view of the first metal layer and the first conductive layer in the J6 region of FIG. 22, the shape of the orthographic projection of the second part 1021 on the first substrate 101 may include at least one of a strip shape, a circle shape, and an ellipse shape. The shape of the second part 1021B in this embodiment may be flexibly selected and set according to design requirements. It only needs to meet the requirement that no short-circuit interference occurs between adjacent conductive pads 1021 after the second parts 1021 are disposed. The embodiment shown in the figure is only an example of the shape of the orthographic projection of the second part 1021 on the first substrate 101, and other shapes may also be selected during specific implementation, as long as the connection between the bias voltage line 1031 and the conductive pad 1021 can be enhanced to improve the electrical connection reliability.

In the present disclosure, the antenna may at least include the first base plate, and the base plate may include the phase shifter array area and the bonding area. The phase shifter array area may be used for setting a microstrip line structure for the transmission of the microwave signals. The bonding area may be used to set the plurality of conductive pads, and the plurality of conductive pads may be used to subsequently bond a driving chip in the bonding area for providing the driving signal required for the antenna to work through the driving circuit when the antenna is working. The first base plate may include the first substrate, the first metal layer and the first conductive layer. The plurality of conductive pads and the plurality of phase shifters may be formed from the same first metal layer. The first metal layer may be made of copper, molybdenum and copper lamination, titanium and copper lamination, molybdenum-copper alloy or titanium-copper alloy materials. The cost of the material may be reduced. Also, the same mask may be used for forming the plurality of phase shifter units and the plurality of conductive pads, which is beneficial to reduce light (mask) to reduce the related process cost and improve the process efficiency. Further, the first metal layer made of copper, molybdenum and copper laminate, titanium and copper laminate, molybdenum copper alloy or titanium copper alloy may be made thick to meet the coupling effect of high-frequency signals in the microstrip line structure and ensure the performance of the antenna. The first conductive layer may include the plurality of bias voltage lines, and each phase shifter unit of the microstrip line structure may be independently controlled by at least one bias voltage line. That is, the plurality of bias voltage lines may be used to transmit the voltage signal provided by the external driving circuit subsequently bonded in the bonding area to the plurality of phase shifter units of the microstrip line structure through the corresponding plurality of conductive pads, to realize the wireless communication function of the antenna. Further, in the direction perpendicular to the plane where the first substrate is located, in one bias voltage line, at least some sections of the bias voltage line may partially overlap with the corresponding phase shifter unit, and at least some sections of the bias voltage line may overlap with the corresponding conductive pad. The two ends of the bias voltage line made of transparent conductive material may overlap with the corresponding phase shifter unit of the microstrip line structure and the corresponding conductive pad through the ramping process, to realize the electrical connection effect of them. The stability and reliability of the electrical connection among them may be improved. The plurality of bias voltage lines may be made of a conductive material with high resistance characteristics instead of the metal material in the existing technologies. Therefore, the high frequency signal leaked during the use of the antenna may be dissipated in the plurality of bias voltage lines during the transmission process because of the high resistance characteristics of the high resistance conductive material. The leakage of high-frequency signals may be alleviated, reducing the impact of high-frequency signals on external drive circuits such as drive chips, and the overall performance of the antenna may be improved.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above-described embodiments, the present disclosure is not limited to the above described embodiments, but may be embodied in other equivalent forms without departing from the scope of the present disclosure, which is determined by the appended claims.

What is claimed is:

1. An antenna, comprising a first base plate, wherein:

the first base plate has a phase shifter array area and a bonding area;

the first base plate includes a first substrate, a first metal layer, and a first conductive layer;

the first metal layer is made of a material including copper, molybdenum and copper laminate, titanium and copper laminate, molybdenum-copper alloy, or titanium-copper alloy;

the first conductive layer is made of a high-resistance conductive material, and is located away on a side of the first metal layer away from the first substrate;

the first metal layer includes a plurality of conductive pads and a plurality of phase shifter units;

at least a portion of the plurality of conductive pads is located in the bonding area, and at least a portion of the plurality of phase shifter units is located in the phase shifter array area;

the first conductive layer includes a plurality of bias voltage lines, and one of the plurality of conductive pads is electrically connected to a corresponding one of the plurality of phase shifter units through at least one of the plurality of bias voltage lines; and in a direction perpendicular to a plane where the first substrate is located, in one same bias voltage line of the plurality of bias voltage lines, at least some sections of the bias voltage line partially overlap with a corresponding one of the plurality of the phase shifter units, and at least some sections of the bias voltage line overlap with a corresponding one of the plurality of conductive pads.

2. The antenna according to claim 1, further comprising a second base plate, wherein:

the first base plate is arranged opposite to the second base plate;

a liquid crystal layer is disposed between the first base plate and the second base plate;

the second base plate includes a second substrate and a second metal layer;

the second metal layer is located on a side of the second substrate facing the first substrate; and the second metal layer includes a ground structure.

3. The antenna according to claim 2, wherein:

the first base plate and the second base plate are fixed by a frame glue;

the frame glue is arranged between the first base plate and the second base plate, surrounding the liquid crystal layer;

an orthographic projection of the plurality of conductive pads on the first substrate does not overlap with an orthographic projection of the frame glue on the first substrate; and along a direction from the bonding area to the phase shifter array area, the plurality of conductive pads is located on a side of the frame glue away from the liquid crystal layer.

4. The antenna according to claim 2, wherein:

the first base plate and the second base plate are fixed by a frame glue;

the frame glue is arranged between the first base plate and the second base plate, surrounding the liquid crystal layer; and an orthographic projection of the plurality of conductive pads on the first substrate at least partially overlaps with an orthographic projection of the frame glue on the first substrate.

5. The antenna according to claim 2, wherein:

an orthographic projection of the plurality of conductive pads on the first substrate at least partially overlaps with an orthographic projection of the liquid crystal layer on the first substrate.

6. The antenna according to claim 2, wherein:

the ground structure of the second metal layer includes a plurality of first radiation holes and a plurality of second radiation holes;

a third metal layer is further disposed on a side of the second substrate away from the liquid crystal layer;

the third metal layer includes a plurality of radiation patches and a power division network structure;

an orthographic projection of the plurality of radiation patches on the plane where the second substrate is located and an orthographic projection of the plurality of first radiation holes on the plane where the second substrate is located overlap;

the power division network structure includes a plurality of output ends; and an orthographic projection of the plurality of output ends on the plane where the second substrate is located overlaps with an orthographic projection of the plurality of second radiation holes on the plane where the second substrate is located.

7. The antenna according to claim 1, wherein:

one bias voltage line of the plurality of bias voltage lines includes a first subsection and a second subsection;

the first subsection and the second subsection are respectively located at two ends of the bias voltage line;

in the direction perpendicular to the plane where the first substrate is located, the first subsection covers one corresponding conductive pad of the plurality of conductive pads; and an area of an orthographic projection of the first subsection on the first substrate is larger than an area of an orthographic projection of the corresponding conductive pad on the first substrate.

8. The antenna according to claim 7, wherein:

a minimum distance from an edge of the first subsection to an edge of the corresponding conductive pad is about 2 μm to about 20 μm.

9. The antenna according to claim 7, wherein:

one phase shifter unit of the plurality of phase shifter units includes a first end;

in the direction perpendicular to the plane where the first substrate is located, the second subsection covers one corresponding first end; and an area of an orthographic projection of the second subsection on the first substrate is larger than an area of an orthographic projection of the corresponding first end portion on the first substrate.

10. The antenna according to claim 1, further comprising a first insulating layer between the first metal layer and the first conductive layer, wherein:

the first insulating layer includes a plurality of first through holes and a plurality of second through holes;

an orthographic projection of one of the plurality of first through holes on the first substrate is located within an orthographic projection of a corresponding one of the plurality of conductive pads on the first substrate, and one of the plurality of bias voltage lines is electrically connected to a corresponding one of the plurality of conductive pads through a corresponding one of the plurality of first through holes; and an orthographic projection of one of the plurality of second through holes on the first substrate is located within an orthographic projection of a corresponding one of the plurality of phase shifter units on the first substrate, and one of the plurality of bias voltage lines is electrically connected to a corresponding one of the plurality of phase shifter units through a corresponding one of the plurality of second through holes.

11. The antenna according to claim 10, wherein:

the first insulating layer is made of a material including silicon nitride.

12. The antenna according to claim 10, wherein:

the first insulating layer is made of a composite material including an organic material and silicon nitride, or a composite material including an organic material and silicon oxide.

13. The antenna according to claim 1, further comprising a second insulating layer on a side of the first conductive layer away from the first substrate, wherein:

The second insulating layer includes a plurality of hollow parts, and in the direction perpendicular to the plane where the first substrate is located, the plurality of hollow parts penetrates through the second insulating layer.

14. The antenna according to claim 13, wherein:

an orthographic projection of one of the plurality of hollow parts on the first substrate is located within an orthographic projection of a corresponding one of the plurality of conductive pads on the first substrate, and the second insulating layer exposes a portion of the plurality of bias voltage lines through the plurality of hollow parts.

15. The antenna according to claim 1, wherein:

in at least a portion of the plurality of conductive pads, each conductive pad includes a first part and a second part, wherein the first part and the second part are arranged along a direction from the bonding area to the phase shifter array area; and along a first direction, an outer diameter of the second part is larger than an outer diameter of the first part, wherein the first direction is perpendicular to the direction from the bonding area to the phase shifter array area.

16. The antenna according to claim 15, wherein:

two second parts of two adjacent conductive pads of the plurality of conductive pads are staggered from each other.

17. The antenna according to claim 15, wherein:

along the direction from the bonding area to the phase shifter array area, the second part is located on an end of the conductive pad; or along the direction from the bonding area to the phase shifter array area, the second part is located at middle of the conductive pad.

18. The antenna according to claim 15, wherein:

a shape of an orthographic projection of the second part on the first substrate includes at least one of a strip shape, a circle, or an ellipse.

19. The antenna according to claim 1, wherein:

the first conductive layer is made of a material including indium/tin oxide or chromium.

20. The antenna according to claim 1, wherein:

in the direction perpendicular to the plane where the first substrate is located, a thickness of the first metal layer is about 0.5 μm to about 5 μm.

* * * * *